(12) United States Patent
Kanbayashi et al.

(10) Patent No.: US 11,038,191 B2
(45) Date of Patent: Jun. 15, 2021

(54) FUEL CELL MODULE AND FUEL CELL APPARATUS

(71) Applicants: KYOCERA CORPORATION, Kyoto (JP); DAINICHI CO., LTD., Niigata (JP)

(72) Inventors: Tatsuya Kanbayashi, Niigata (JP); Kentaro Tanaka, Niigata (JP); Takayuki Maruyama, Niigata (JP); Akinori Fukuda, Niigata (JP)

(73) Assignees: KYOCERA Corporation, Kyoto (JP); DAINICHI CO., LTD., Niigata (JP)

( * ) Notice: Subject to any disclaimer, the term of this patent is extended or adjusted under 35 U.S.C. 154(b) by 169 days.

(21) Appl. No.: 16/310,854

(22) PCT Filed: Jun. 14, 2017

(86) PCT No.: PCT/JP2017/021999
§ 371 (c)(1),
(2) Date: Dec. 18, 2018

(87) PCT Pub. No.: WO2017/221790
PCT Pub. Date: Dec. 28, 2017

(65) Prior Publication Data
US 2019/0319293 A1    Oct. 17, 2019

(30) Foreign Application Priority Data

Jun. 20, 2016  (JP) .............................. JP2016-122167
Jun. 30, 2016  (JP) .............................. JP2016-130973

(51) Int. Cl.
*H01M 8/2475*   (2016.01)
*H01M 8/2432*   (2016.01)
(Continued)

(52) U.S. Cl.
CPC ........... *H01M 8/2475* (2013.01); *H01M 8/04* (2013.01); *H01M 8/06* (2013.01); *H01M 8/2432* (2016.02); *H01M 8/2457* (2016.02)

(58) Field of Classification Search
CPC ............. H01M 8/2475; H01M 8/2432; H01M 8/2457; H01M 8/04; H01M 8/06
See application file for complete search history.

(56) References Cited

U.S. PATENT DOCUMENTS 5,573,867 A  * 11/1996 Zafred ................ H01M 8/0271
                                                    429/410
2006/0127730 A1* 6/2006 Andreas-Schott ...... H01M 8/02
                                                    429/454
(Continued)

FOREIGN PATENT DOCUMENTS

CN      101116207 A    1/2008
CN      105322208 A    2/2016
(Continued)

*Primary Examiner* — Helen Oi K Conley
(74) *Attorney, Agent, or Firm* — Viering, Jentschura & Partner MBB

(57) ABSTRACT

In accordance with a fuel cell module, a cell stack is housed in a housing including a box and a lid, and the lid is provided with a first gas flow channel through which either one of oxygen containing gas and exhaust gas flows. Therefore, the configuration of the housing can be simplified. Since the lid is provided with the gas flow channel, an accommodation space inside the box can be enlarged, the cell stack can be easily housed inside the housing through an opening, and the fuel cell module can be easily assembled.

19 Claims, 16 Drawing Sheets

(51) Int. Cl.
*H01M 8/2457* (2016.01)
*H01M 8/04* (2016.01)
*H01M 8/06* (2016.01)

(56) References Cited

U.S. PATENT DOCUMENTS

2011/0117457 A1    5/2011    Nakamura et al.
2014/0023950 A1    1/2014    Yamamoto et al.
2016/0036084 A1    2/2016    Kim et al.

FOREIGN PATENT DOCUMENTS

| EP | 2608304 A1 | 6/2013 |
|----|------------|--------|
| EP | 2608306 A1 | 6/2013 |
| JP | 2005100942 A | 4/2005 |
| JP | 201228099 A | 2/2012 |
| JP | 2012028098 A | 2/2012 |
| JP | 2013131329 A | 7/2013 |
| JP | 2013131331 A | 7/2013 |
| JP | 2015138580 A | 7/2015 |
| JP | 2016046247 A | 4/2016 |

\* cited by examiner

FUEL CELL MODULE AND FUEL CELL APPARATUS

CROSS-REFERENCE TO RELATED APPLICATIONS

This application is a national stage entry according to 35 U.S.C. 371 of PCT Application No. PCT/JP2017/021999 filed on Jun. 14, 2017, which claims priority to Japanese Application Nos. 2016-122167 filed on Jun. 20, 2016 and 2016-130973 filed on Jun. 30, 2016, which are entirely incorporated herein by reference.

TECHNICAL FIELD

The present disclosure relates to a fuel cell module and a fuel cell apparatus.

BACKGROUND

In recent years, as next-generation energy, a fuel cell module in which a cell stack apparatus provided with fuel cells capable of obtaining power by using fuel gas (hydrogen containing gas) and air (oxygen containing gas) is housed in an accommodation apparatus and a fuel cell apparatus in which a fuel cell module is housed in an exterior case have been proposed in various types.

The fuel cell module has a structure in which the cell stack apparatus is housed in a housing, and a flow channel for supplying oxygen containing gas to the cell stack apparatus and a flow channel for discharging exhaust gas to the outside are all formed within the housing in advance (for example, see Japanese Unexamined Patent Publication JP-A 2012-28099 (Patent Literature 1)).

SUMMARY

A fuel cell module according to one non-limiting aspect of the present disclosure includes a housing and a cell stack. The housing includes a box one side of which is open and a lid closing the opening. The cell stack is housed in an accommodation chamber disposed inside the housing. In the cell stack, a plurality of fuel cells generating power by fuel gas and oxygen containing gas are disposed and electrically connected together. The lid is provided with a first gas flow channel through which either one of the oxygen containing gas and exhaust gas which is discharged from the accommodation chamber flows.

Moreover, a fuel cell apparatus according to one non-limiting aspect of the present disclosure includes the fuel cell module mentioned above, an auxiliary machine which operates the fuel cell module, and an external case which houses the fuel cell module and the auxiliary machine.

DETAILED DESCRIPTION

A fuel cell module of the present non-limiting embodiment includes a housing having an accommodation chamber therein, and a cell stack housed in the accommodation chamber, the cell stack including a plurality of fuel cells each of which generate power by fuel gas and oxygen containing gas, the plurality of fuel cells being electrically connected together.

Figure 1:
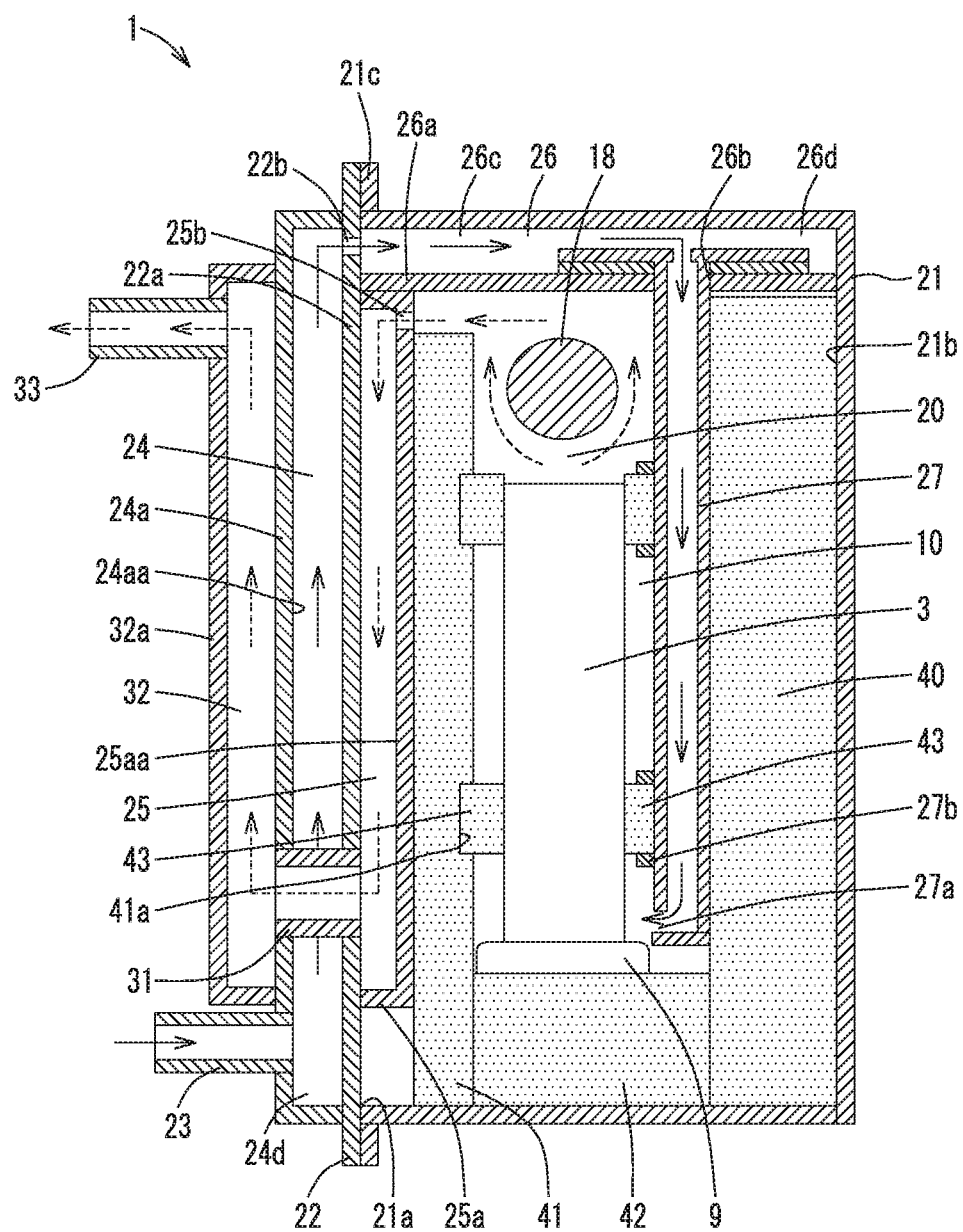
FIG. 1 is a cross-sectional view showing an example of a fuel cell module of the present non-limiting embodiment.
Figure 2:
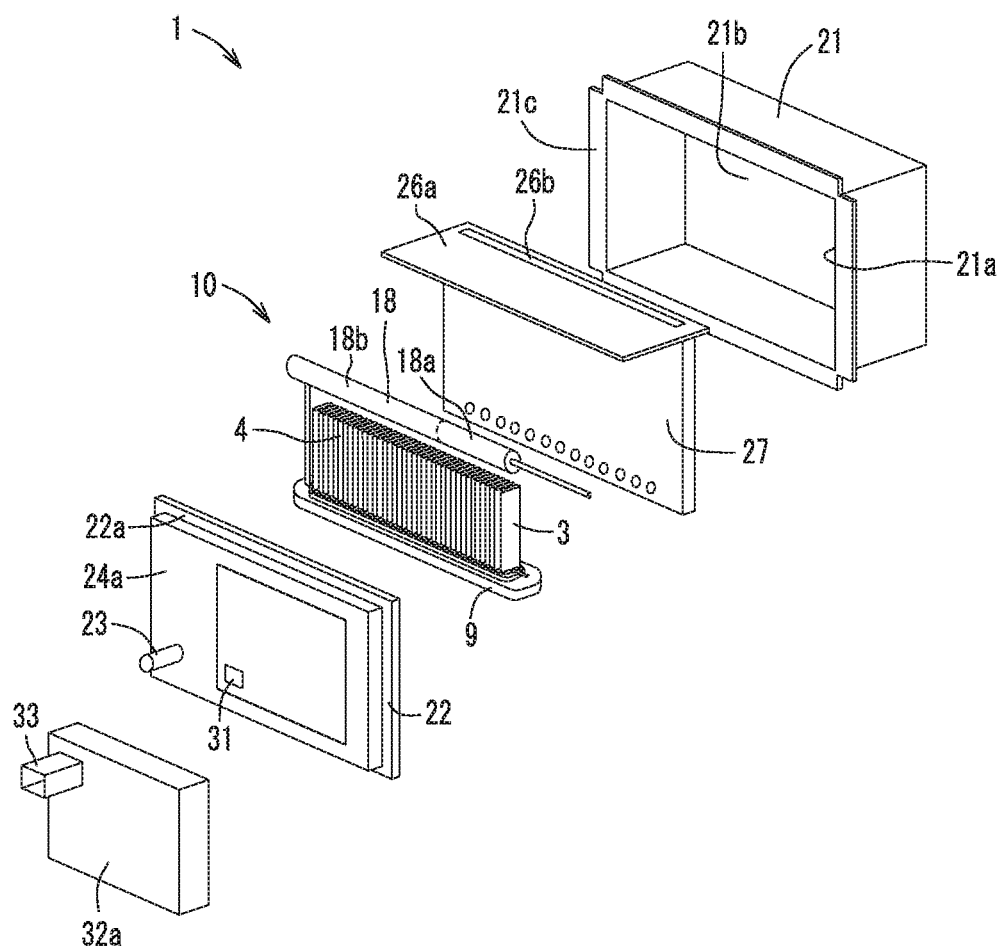
FIG. 2 is an exploded perspective view showing the example of the fuel cell module of the present non-limiting embodiment.

FIG. 1 is a cross-sectional view of a fuel cell module 1 showing an example of the present non-limiting embodiment, and FIG. 2 is an exploded perspective view of the fuel cell module 1.

In a cell stack apparatus 10 shown in FIGS. 1 and 2, hollow and tabular type columnar fuel cells 3 having a gas flow channel inside which fuel gas flows from one end to the other end are aligned in a upright state, and the fuel cells 3 adjoining in the alignment direction are electrically connected in series through a conductive material. At the lower ends of the fuel cells 3, a row of cell stack 4 fixed to a manifold 9 by an insulating adhesive agent is disposed. The fuel cells 3 are only necessarily columnar and are applicable, for example, to a cylindrical type and a horizontal-striped type.

Above the cell stack 4, a reformer 18 for generating fuel gas supplied to the fuel cells 3 is disposed to form the cell stack apparatus 10, which is housed in a housing 2.

The reformer 18 generates fuel gas by reforming raw fuel such as natural gas or kerosene supplied through a raw fuel supply pipe. The reformer 18 may have a structure capable of performing steam reforming which is a reforming reaction with excellent reforming efficiency. The reformer 18 includes a vaporization portion 18a for vaporizing water and a reforming portion 18b in which a reforming catalyst for reforming the raw fuel into fuel gas is disposed.

The housing 2 includes a box 21 one side of which is open and a lid 22 closing an opening 21a of the box 21. In the present non-limiting embodiment, the box 21 is in the shape of a rectangular parallelepiped, and of the six surfaces of the rectangular parallelepiped, one of a pair of surfaces with the largest area is open. The other surface 21b opposed to the opening 21a is a bottom surface 21b of the box 21, and the other four surfaces are side surfaces of the box 21.

In the fuel cell module 1, at the time of its operation, as shown in FIG. 2, the manifold 9 is located below the cell stack 4, and the reformer 18 is located above the cell stack 4. When viewed from the alignment direction side of the fuel cells 3 of the cell stack 4, the opening 21a and the bottom surface 21b of the box 21 are located in the right-left direction, that is, at the sides, respectively. Moreover, since the lid 22 closes the opening 21a, at the time of operation, the lid 22 and the bottom surface 21b are located at the sides, respectively.

In the fuel cell module 1 of the present non-limiting embodiment, a combustion portion 20 is provided between the reformer 18 and the cell stack 4 (the fuel cells 3). By combusting, at the combustion portion 20, the fuel gas not used for the power generation at the fuel cells 3, the temperature of the reformer 18 and the temperature in the housing 2 can be efficiently increased.

The flows of oxygen containing gas and exhaust gas in the fuel cell module 1 will be described together with the structures of the flow channels thereof. In the present non-limiting embodiment, the oxygen containing gas is air existing outside the fuel cell module 1. A tubular introducing portion 23 for supplying this air from outside into the fuel cell module is provided on the outer surface of the lid 22.

The lid 22 is provided with a first gas flow channel 24 through which either one of the oxygen containing gas and the exhaust gas which is discharged from an accommodation chamber 11 flows. Moreover, in the present non-limiting embodiment, there is further provided a second gas flow channel 25 which is disposed adjacent to the first gas flow channel 24 and through which the other of the oxygen containing gas and the exhaust gas flows. By disposing a second heat insulating material 41 described later with a gap from the first gas flow channel 24, the gap can be made a fifth gas flow channel through which the other of the oxygen containing gas and the exhaust gas flows instead of the second gas flow channel 25. In the present non-limiting embodiment, the gas flow channel provided on the outer side is the first gas flow channel 24, and in the first gas flow channel 24, air as the oxygen containing gas flows. Moreover, the gas flow channel provided on the inner side, that is, on the box 21 side, is the second gas flow channel 25, and in the second gas flow channel 25, the exhaust gas flows. While an example in which the first gas flow channel 24 is provided on the outer side (outer surface side) of the lid 22 and the second gas flow channel 25 is provided on the inner side (the box 21 side) is shown in the figures, there may be adopted a structure in which the first gas flow channel and the second gas flow channel are provided on the outer side (outer surface side) of the lid 22 or on the inner side (the box 21 side) of the lid 22.

In the present non-limiting embodiment, the lid 22 includes a tabular lid body 22a for closing the opening 21a of the box 21, a first flow channel member 24a which is disposed on the outer surface side of the lid body 22a facing outward and defines the first gas flow channel 24, and a second flow channel member 25a which is disposed on the inner surface side facing the box 21 and defines the second gas flow channel 25. The first flow channel member 24a and the second flow channel member 25a are both substantially rectangular plate-like members, and at the four sides, parts erected by the amount of the flow channel width are disposed on a first surface (one principal surface) 24aa side of the first flow channel member 24a and on a first surface (one principal surface) 25aa side of the second flow channel member 25a. By joining the erected four side portions to the inner surface or the outer surface of the lid body 22a, the gap between the lid body 22a and the first flow channel member 24a becomes the first gas flow channel 24, and the gap between the lid body 22a and the second flow channel member 25a becomes the second gas flow channel 25. That is, in the present non-limiting embodiment, the lid body 22a is the flow channel partitioning portion which partitions the first gas flow channel 24 and the second gas flow channel 25.

In the fuel cell module 1 of the present non-limiting embodiment, by joining the first flow channel member 24a and the second flow channel member 25a so as to be placed one on another with a gap in between on the tabular lid body 22a, the flow channel for the air and the flow channel for the exhaust gas can be easily formed. Moreover, by the provision of the gas flow channels on the lid 22, the gas flow channel provided on the box 21 can be reduced, so that the structure of the box 21 can be made a simple structure.

In the present non-limiting embodiment, the introducing portion 23 for introducing air communicates with the first gas flow channel 24. The introducing portion 23 is provided, for example, at a lower end of the lid 22, and the air introduced from the introducing portion 23 flows upward from below in the first gas flow channel 24. The first gas flow channel 24 may be a meandering flow channel. In order to introduce air into the housing 2, that is, to the inner side of the lid 22 at an upper end of the first gas flow channel 24, an inlet 22b such as a hole or a slit passing through in the thickness direction (right-left direction) is provided at an upper end of the lid body 22a. In the present non-limiting embodiment, as the inlet 22b, a plurality of through holes disposed in parallel in the alignment direction of the fuel cells 3 of the cell stack 4 are provided. By providing the structure having a plurality of through holes, reduction in mechanical strength is suppressed, so that a sufficient amount of air can be admitted to the inner side of the lid 22.

The air having flowed into the housing 2 from the inlet 22b flows, above the reformer 18, toward the bottom surface of the box 21 beyond the reformer 18 and the cell stack 4 through a third gas flow channel 26 formed inside the box 21. The third gas flow channel 26 is defined by a third flow channel member 26a including a plate-like member parallel to, of the inner side surfaces of the box 21, the inner side surface facing the reformer 18, that is, the inner side surface located at an upper part at the time of operation.

The third gas flow channel 26 is connected to an oxygen containing gas introducing plate 27 in a position on the downstream side in the flow direction and between the reformer 18 and the cell stack 4, and the bottom surface 21b. The oxygen containing gas introducing plate 27 includes, for example, two plate-like members joined together at the peripheries thereof with a gap in between, and only the part communicating with the third gas flow channel 26 and an oxygen containing gas introducing port 27a for supplying air as the oxygen containing gas to the cell stack 4 are opened and the remainder is closed.

The third gas flow channel 26 is provided on the upper side which is one end side in the length direction of the fuel cells 3, and the introducing portion 23 and the oxygen containing gas introducing port 27a are provided on the lower side which is the other end side in the length direction of the fuel cells 3.

The oxygen containing gas introducing plate 27 is connected to the third gas flow channel 26 in a communicating hole 26b provided in the third flow channel member 26a, and the air flowing in the third gas flow channel 26 passes through the communicating hole 26b and flows into the oxygen containing gas introducing plate 27.

In the present non-limiting embodiment, the third gas flow channel 26 has a main flow channel portion 26c connecting from the first gas flow channel 24 to the oxygen containing gas introducing plate 27 and an extended portion 26d extending toward the bottom surface 21b of the box 21 beyond the position where the oxygen containing gas introducing plate 27 and the main flow channel portion 26c are connected. There may be adopted a structure in which the third gas flow channel 26 is formed only of the main flow channel portion 26c without the provision of the extended portion 26d.

The air having flowed into the oxygen containing gas introducing plate 27 flows downward along the bottom surface 21b of the box 21, is discharged from the oxygen containing gas introducing port 27a provided at the downstream end in the flow direction, and is supplied to regions between the fuel cells 3 of the cell stack 4. The lower end of the oxygen containing gas introducing plate 27 is extended up to the manifold 9, and the air discharged from the oxygen containing gas introducing port 27a is supplied to the neighborhood of the lower end, fixed to the manifold 9, of the cell stack 4. By the extension of the lower end of the oxygen containing gas introducing plate 27 up to the manifold 9, even if the oxygen containing gas introducing plate 27 is deformed by heat, it abuts on the manifold 9, so that further deformation can be suppressed. Further, the lower end of the oxygen containing gas introducing plate 27 may be previously configured to abut on the edge portion of the manifold 9. Thereby, the deformation and movement of the oxygen containing gas introducing plate 27 due to heat or the like can be more suppressed, and the position of the manifold 9 on which the oxygen containing gas introducing plate 27 abuts can be more surely fixed. Therefore, in the fuel cell module 1 of the present non-limiting embodiment, even if transportation or the like is performed, the cell stack apparatus 10 is firmly fixed, so that movement due to vibration, swing or the like is prevented.

At the fuel cells 3, the air supplied to regions between the fuel cells 3 is used for power generation reaction together with the fuel gas supplied from the reformer 18 through the manifold 9, and power is generated at each fuel cell 3.

The fuel gas and the air not used for the power generation reaction are, for example, ignited by an ignition apparatus such as an ignition heater to be combusted at the combustion portion 20 between the cell stack 4 and the reformer 18, so that high temperature exhaust gas is generated. The exhaust gas flows into the second gas flow channel 25 through a communicating hole 25b provided in an upper part of the second flow channel member 25a, and flows downward along the lid body 22a. As described above, the air having flowed in from outside flows upward in the first gas flow channel 24, the exhaust gas flows downward in the second gas flow channel 25 adjacent to the first gas flow channel 24, and during this time, heat exchange occurs between the comparatively low temperature air and the comparatively high temperature exhaust gas with the lid body 22a in between, so that the air is warmed and the exhaust gas is cooled.

At the lower side end which is the downstream end of the second gas flow channel 25, the heat-exchanged exhaust gas is discharged to the outside of the first gas flow channel 24 through an discharging portion 31 crossing the first gas flow channel 24 orthogonally to the flow direction of the first gas flow channel 24.

The exhaust gas discharged from the discharging portion 31 is supplied to a heat exchanger. At the heat exchanger, heat exchange is performed with externally supplied water, the heated hot water is used, for example, for a water heater, and the condensed water caused by heat-exchanging the exhaust gas is reused for steam reforming at the reformer 18. In the present non-limiting embodiment, a fourth gas flow channel 32 is provided further outside the first gas flow channel 24, and the exhaust gas discharged from the discharging portion 31 flows into the fourth gas flow channel 32 and flows upward along the fourth gas flow channel 32. In the fourth gas flow channel 32, for example, a combustion catalyst for combusting uncombusted gas not combusted at the combustion portion 20 either may be disposed so that the uncombusted gas is not discharged to the outside from the fuel cell module 1. Like the first gas flow channel 24 and the second gas flow channel 25, the fourth gas flow channel 32 is defined by a fourth flow channel member 32a.

The exhaust gas having flowed upward along the fourth gas flow channel 32 communicates with a tube 33 of connection with the heat exchanger at the upper side end which is the downstream side end of the fourth gas flow channel 32, and is supplied to the heat exchanger through the connection tube 33.

Moreover, in the housing 2, insulating materials for maintaining the temperature in the fuel cell module 1 high are provided as appropriate so that the heat in the fuel cell module 1 is prevented from being extremely dissipated to decrease the temperature of the fuel cells 3 and reduce the power generation amount.

A first insulating material 40 is disposed between the bottom surface 21b of the box 21 and the oxygen containing gas introducing plate 27 so as to cover the entire area of the bottom surface 21b. A second insulating material 41 is disposed between the cell stack 4 and the second flow channel member 25a of the second gas flow channel 25. A third insulating material 42 is disposed in a position which is the lower side of the manifold 9 at the time of operation. As shown in FIG. 1, the cell stack 4 is surrounded at three sides by the first insulating material 40, the second heat insulating material 41 and the third insulating material 42 disposed in positions which are the right and left sides and the lower side at the time of operation and further, the combustion portion 20 is provided thereabove, so that reduction in the temperature of the fuel cells 3 due to heat dissipation is suppressed.

Further, between the oxygen containing gas introducing plate 27 and the cell stack 4, two belt-like fourth insulating materials 43a extending in the alignment direction of the cell stack 4 are parallelly disposed with a gap in the vertical direction. To the surface of the oxygen containing gas introducing plate 27 facing the cell stack 4, an insulating material fixing member 27b for fixing the fourth insulating materials 43a is attached, and the height position of the fourth insulating materials 43a is determined by this insulating material fixing member 27b. Likewise, between the second heat insulating material 41 and the cell stack 4, two belt-like fourth insulating materials 43b are parallelly disposed with a gap in the vertical direction. On the surface of the second heat insulating material 41 facing the cell stack 4, groove-like concave portions 41a are provided, and the fourth insulating materials 43b are fitted in these groove-like concave portions 41a, whereby the height position thereof is determined. Thereby, the fourth insulating materials 43a and 43b can support the cell stack apparatus 10 in an appropriate position in a transport state or in an operation state.

In the present non-limiting embodiment, the box 21 has an outer flange portion 21c extending outward at the opening 21a. The outer flange portion 21c may extend outward from the entire four sides of the rectangular opening 21a, may extend outward from facing two sides in directions opposite to each other, or may extend outward from one side or three sides.

The outer shape of the lid body 22a is substantially the same as that of the opening 21a, is larger than that of the opening 21a and the same as the outer shape of the outer flange portion 21c including the opening 21a, or is smaller than the outer shape of the outer flange portion 21c. The box 21 and the lid 22 can be easily and firmly fixed, for example, by joining by a bolt or welding the outer flange portion 21c and the outer peripheral portion of the lid body 22a.

Figure 3:
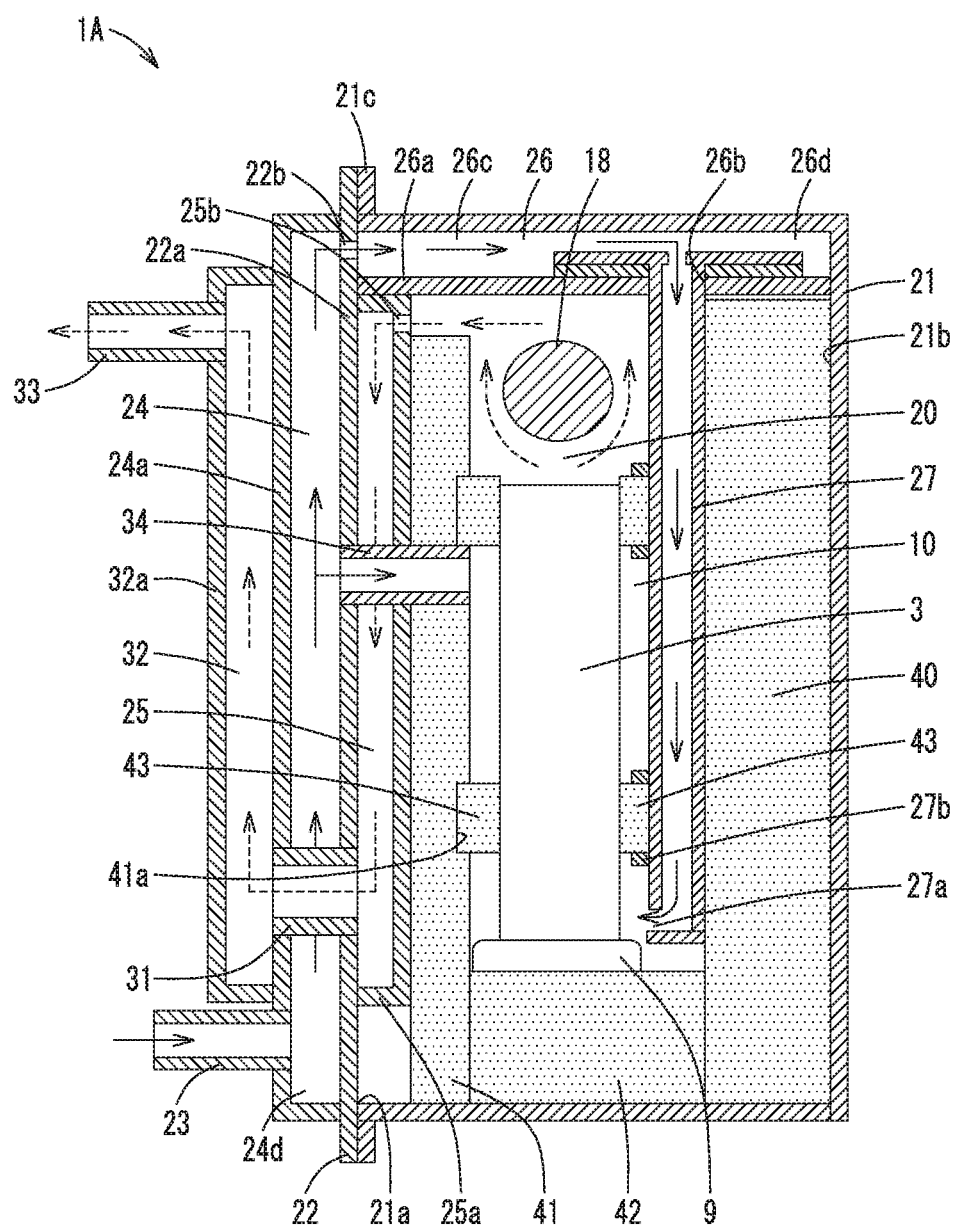
FIG. 3 is a cross-sectional view showing an example of a fuel cell module of another non-limiting embodiment.

FIG. 3 is a cross-sectional view of a fuel cell module 1A of another non-limiting embodiment. While the above has a structure in which the air having flowed into the oxygen containing gas introducing plate 27 is discharged from only the oxygen containing gas introducing port 27a provided at the lower end in the flow direction and is supplied to regions between the fuel cells 3 of the cell stack 4, the present non-limiting embodiment has a structure in which, for example, a diverting portion 34 which diverts the air flowing in the oxygen containing gas introducing plate 27 is disposed in the middle of the first gas flow channel 24 and air is also supplied to regions between the fuel cells 3 of the cell stack 4 from other than the oxygen containing gas introducing port 27a not through the oxygen containing gas introducing plate 27. Descriptions of the constituents other than the diverting portion 34 are omitted since they are similar to those of the non-limiting embodiment shown in FIG. 1.

The diverting portion 34 is disposed so as to pass through the second gas flow channel 25 and the second heat insulating material 41 in the right-left direction. The height position where the diverting portion 34 is disposed may be a position higher than the position ½ the height of the fuel cells 3. With this height position, air of a temperature relatively lower than that of the air discharged from the oxygen containing gas introducing port 27a is supplied to the upper side of the cell stack 4. Thereby, it is possible to reduce the temperature in regions from the upper parts to the middle parts of the fuel cells 3 which regions are in a comparatively high temperature, so that at the fuel cells 3 and the cell stack 4, the temperature distribution can be uniformized in the vertical direction.

Figure 4:
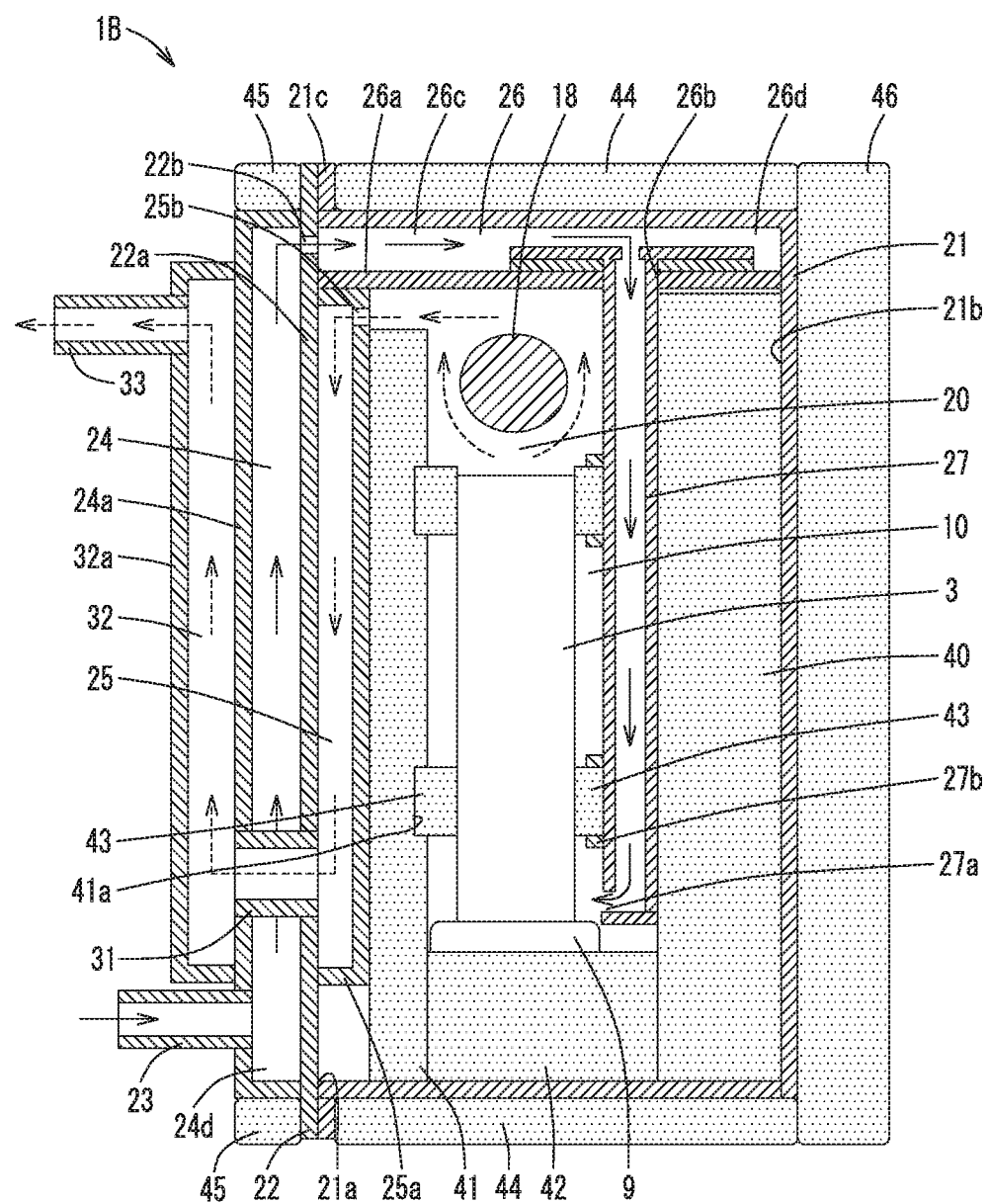
FIG. 4 is a cross-sectional view showing an example of a fuel cell module of still another non-limiting embodiment.

FIG. 4 is a cross-sectional view of a fuel cell module 1B of still another non-limiting embodiment. While in the fuel cell module 1, insulating materials are disposed inside the housing 2 as described above, in the present non-limiting embodiment, insulating materials are further disposed on the outer surface of the housing 2. By providing insulating materials on the outer surface, heat dissipation from the outer surface of the housing 2 is suppressed. Descriptions of the constituents other than the insulating materials provided on the outer surface are omitted since they are similar to those of the non-limiting embodiment shown in FIG. 1.

The insulating materials disposed on the outer surface of the housing 2 include outer side insulating materials covering the outer side surface of the box 21 along the outer flange portion 21c. The outer side insulating materials include a box outer side insulating material 44 disposed along the outer flange portion 21c of the box 21 and a lid outer side insulating material 45 disposed along the outer periphery of the lid 22. The outer flange portion 21c of the box 21 is sandwiched by the box outer side insulating material 44 and the lid outer side insulating material 45 from both sides, and no insulating material is disposed at the end of the outer flange portion 21c.

When the fuel cell module 1B is operating, the temperature is approximately 500 to 800° C. inside the housing 2 and the housing 2 is also heated to cause thermal expansion. Since the outer flange portion 21c thermally expands so as to further extend outward, for example, if an insulating material is disposed at the end of the outer flange portion 21c, the insulating material is broken by the thermally expanded outer flange portion 21c.

In the present non-limiting embodiment, since the box outer side insulating material 44 and the lid outer side insulating material 45 are disposed so as to sandwich the outer flange portion 21c from both sides thereof, even if the thermal expansion of the outer flange portion 21c occurs, breakage of the insulating material can be suppressed. If space which allows the outer flange portion 21c to thermally expand is present, the thicknesses of the box outer side insulating material 44 and the lid outer side insulating material 45 may be larger than the height direction of the outer flange portion 21c.

In addition to the outer side insulating material disposed along the outer flange portion 21c, the outer side insulating material may further include a bottom surface outer side insulating material 46 disposed so as to cover the bottom surface of the box 21.

Moreover, as a modified example of the present non-limiting embodiment, the fuel cell module 1B may further include a sub insulating material between the outer side insulating materials and the box 21. The sub insulating material is made of a material more excellent in heat resistance than the outer side insulating materials, and by thus using the sub insulating material, a material with a comparatively low heat-resistant temperature can be used for the outer side insulating materials. The outer side insulating materials may be formed of, for example, glass wool or rock wool, and the sub insulating material may be formed of, for example, ceramic fiber containing alumina/silica as a major ingredient.

Figure 5:
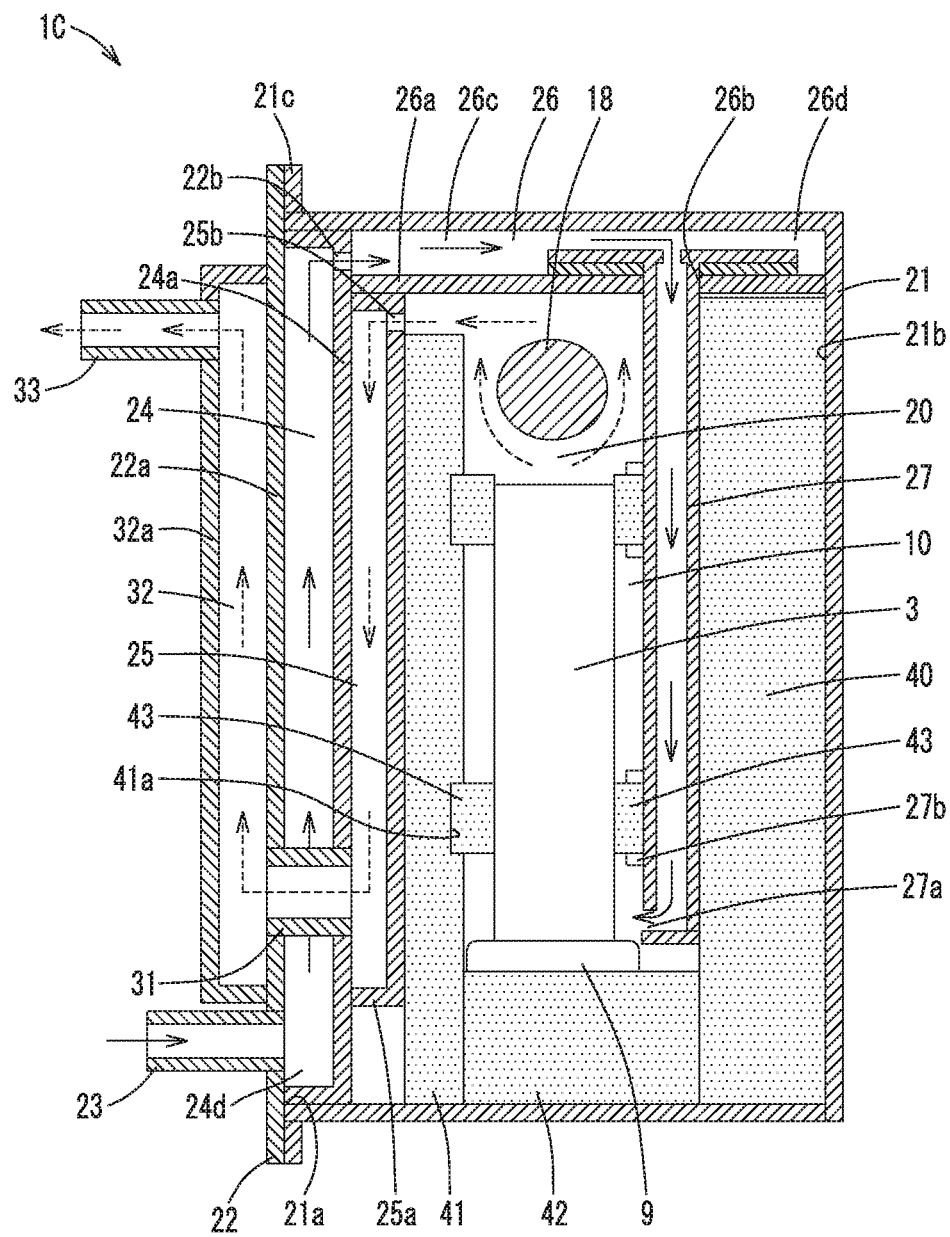
FIG. 5 is a cross-sectional view showing an example of a fuel cell module of still another non-limiting embodiment.

FIG. 5 is a cross-sectional view of a fuel cell module 1C of still another non-limiting embodiment. While the above-described non-limiting embodiments have a structure in which the second gas flow channel 25 is provided on the inner side of the lid body 22a, that is, on the box 21 side of the lid body 22a and the first gas flow channel 24 is provided on the outer side, in the present non-limiting embodiment, the first gas flow channel 24 and the second gas flow channel 25 are both provided on the inner side of the lid body 22a, that is, on the box 21 side. In the present non-limiting embodiment, the first flow channel member 24a is the flow channel partitioning portion. Descriptions of the constituents other than the first gas flow channel 24 and the second gas flow channel 25 are omitted since they are similar to those of the non-limiting embodiment shown in FIG. 1.

By thus structuring the first gas flow channel 24 and the second gas flow channel 25, the first gas flow channel 24 and the second gas flow channel 25 are welded to the lid body 22a from the same side, so that workability can be improved. Although similar effects are obtained even if both the first gas flow channel 24 and the second gas flow channel 25 are provided on the outer side of the lid body 22a, that is, on the fourth gas flow channel 32 side, when the first gas flow channel 24 and the second gas flow channel 25 are provided on the inner side of the lid body 22a as in the present non-limiting embodiment, since the oxygen containing gas flowing in the first gas flow channel 24 is heat-exchanged within the housing 2, heat dissipation to the outside of the housing 2 can be suppressed, so that the temperature of the air supplied to the cell stack 4 can be increased more.

Figure 6:
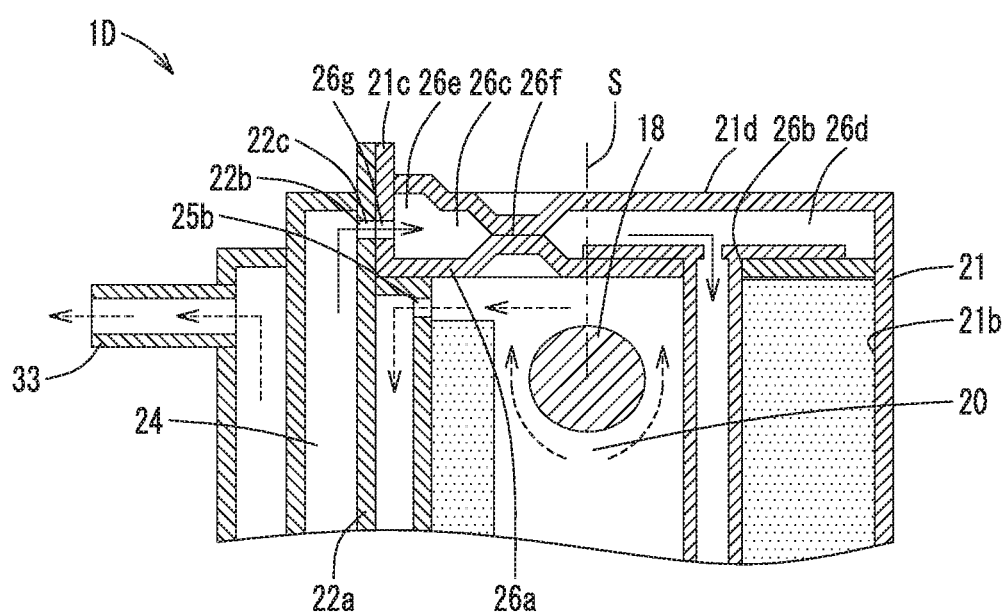
FIG. 6 is an upper part enlarged cross-sectional view showing an example of a fuel cell module of still another non-limiting embodiment.

FIG. 6 is an upper part enlarged cross-sectional view of a fuel cell module 1D of still another non-limiting embodiment. The present non-limiting embodiment is different from the above-described non-limiting embodiments in the structure of the third gas flow channel 26, and in the following, the third gas flow channel 26 will be described and descriptions of other portions are omitted. In the non-limiting embodiment shown in FIG. 6, the inlet 22b includes a first through hole 22c provided at the upper end of the lid body 22a defining the first gas flow channel 24 and a second through hole 26g provided at a part of the third flow channel member 26a facing the first through hole. Moreover, by the upper end of the lid body 22a and the third flow channel member 26a abutting on each other, sealing performance between the first gas flow channel 24 and the third gas flow channel 26, that is, of the lid 22 and the box 21 is ensured. Of the third gas flow channel 26, particularly at an end 26e on the upstream side of the main flow channel portion 26c, that is, at an end on the side connected to the first gas flow channel 24, the flow channel cross-sectional area is larger than at the end on the downstream side. With this structure, since a large area can be secured as the area in which the lid body 22a and the third flow channel member 26a abut on each other around the inlet 22b, in the present non-limiting embodiment, in the vertical direction of the inlet 22b, sealing performance can be improved. Further, when the inlet 22b is a plurality of through holes, by using some through holes as insertion holes through which rivets are inserted, the lid body 22a and the first flow channel member 24a, the third flow channel member 26a and the like can be fixed with a high abutting force, so that sealing performance can be further improved.

There may be provided an abutment portion 26f in which an upper side surface 21d and the third flow channel member 26a, which are a plurality of third gas flow channel walls forming the main flow channel portion 26c of the third gas flow channel 26, are each convex toward the inside of the flow channel to abut on each other. With this structure, the stiffness of the gas flow channel increases, so that deformation of the third gas flow channel 26 can be suppressed.

Further, the abutment portion 26f may be shifted from a surface passing the central axis S of the reformer 18 and vertically extending toward the third gas flow channel 26. With this structure, since the abutment portion 26f is shifted from the surface passing the central axis S, which is a position nearest to the reformer 18 with a high temperature and is susceptive to the influence of the heat of the reformer, and vertically extending toward the third gas flow channel 26, the risk of thermal deformation of the abutment portion 26f is reduced, so that durability of the third gas flow channel 26 can be further improved. That is, the abutment portion 26f can be inhibited from being thermally deformed to reduce the flow channel width.

More than one abutment portion 26f may be aligned in a direction orthogonal to the plane of the figure. Moreover, more than one abutment portion 26f may be aligned in a direction parallel to the plane of the figure (right-left direction).

Figure 7:
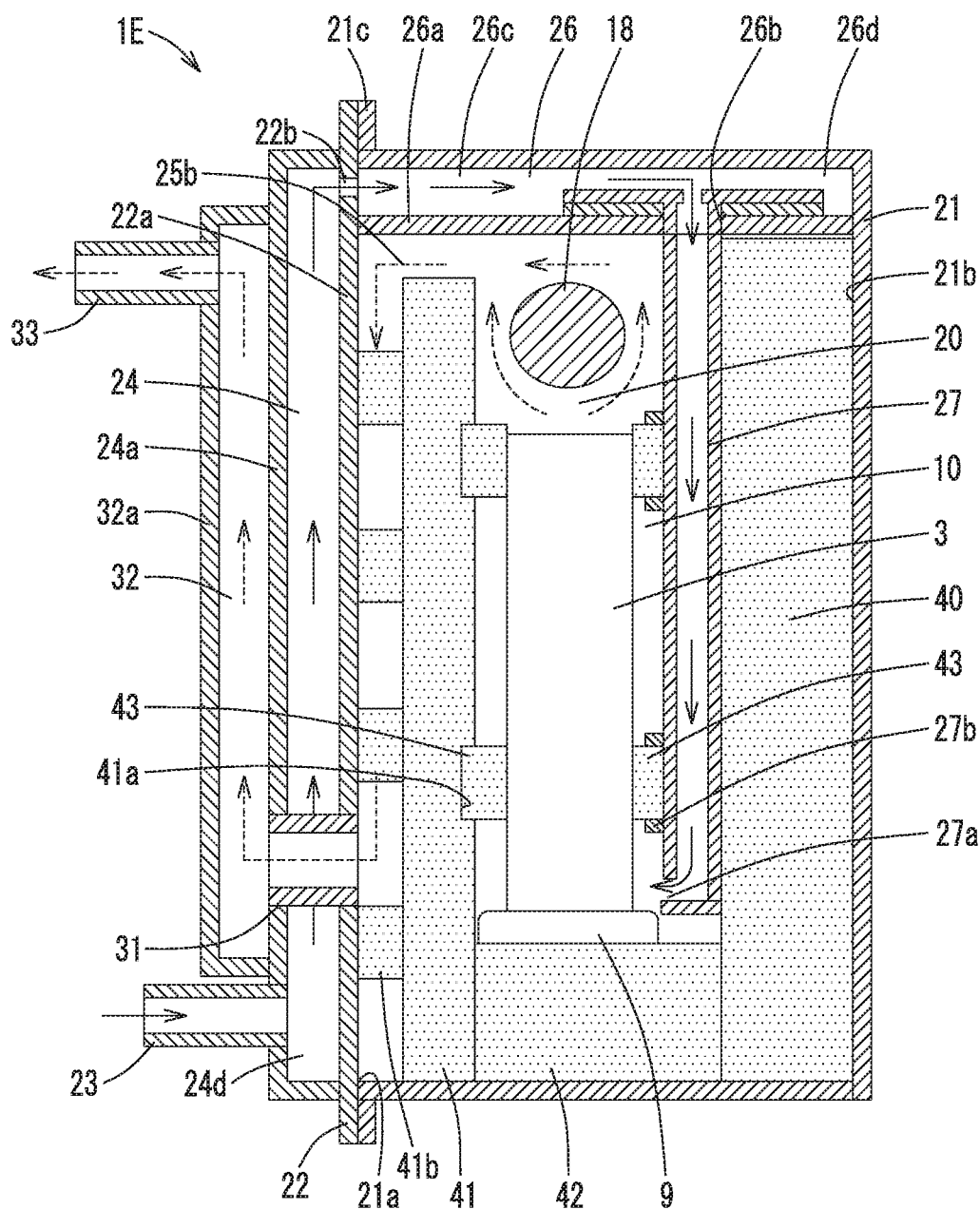
FIG. 7 is a cross-sectional view showing an example of a fuel cell module of still another non-limiting embodiment.

FIG. 7 is a cross-sectional view of a fuel cell module 1E of still another non-limiting embodiment. The present non-limiting embodiment is different from the above-described non-limiting embodiments in that instead of the second flow channel member 25a, a fifth gas flow channel through which exhaust gas flows is provided between the second heat insulating material 41 and the lid body 22a and further, the second heat insulating material 41 includes a rectification portion which makes meander the flow of the exhaust gas flowing in the fifth gas flow channel. Other portions are denoted by the same reference numerals as those of the above-described non-limiting embodiment and descriptions thereof are omitted. For example, by providing a rectification portion 41b abutting on the lid body 22a on the second heat insulating material 41, the space surrounded by the rectification portion 41b, the lid body 22a and the second heat insulating material 41 becomes the fifth gas flow channel. As shown in FIG. 7, the rectification portion 41b may be a convex part protruding from the second heat insulating material 41 to the lid body side.

In the above-described non-limiting embodiment, an assembly process for joining the second flow channel member 25a to the lid body 22a is necessary. On the contrary, in the present non-limiting embodiment, the process itself of disposing the second heat insulating material 41 is not changed if the second heat insulating material 41 in which the rectification portion 41b is previously formed is prepared, the process of assembling the exhaust gas flow channel flowing downward from above can be deleted, so that the fuel cell module 1E can be easily assembled and manufactured.

Figure 8:
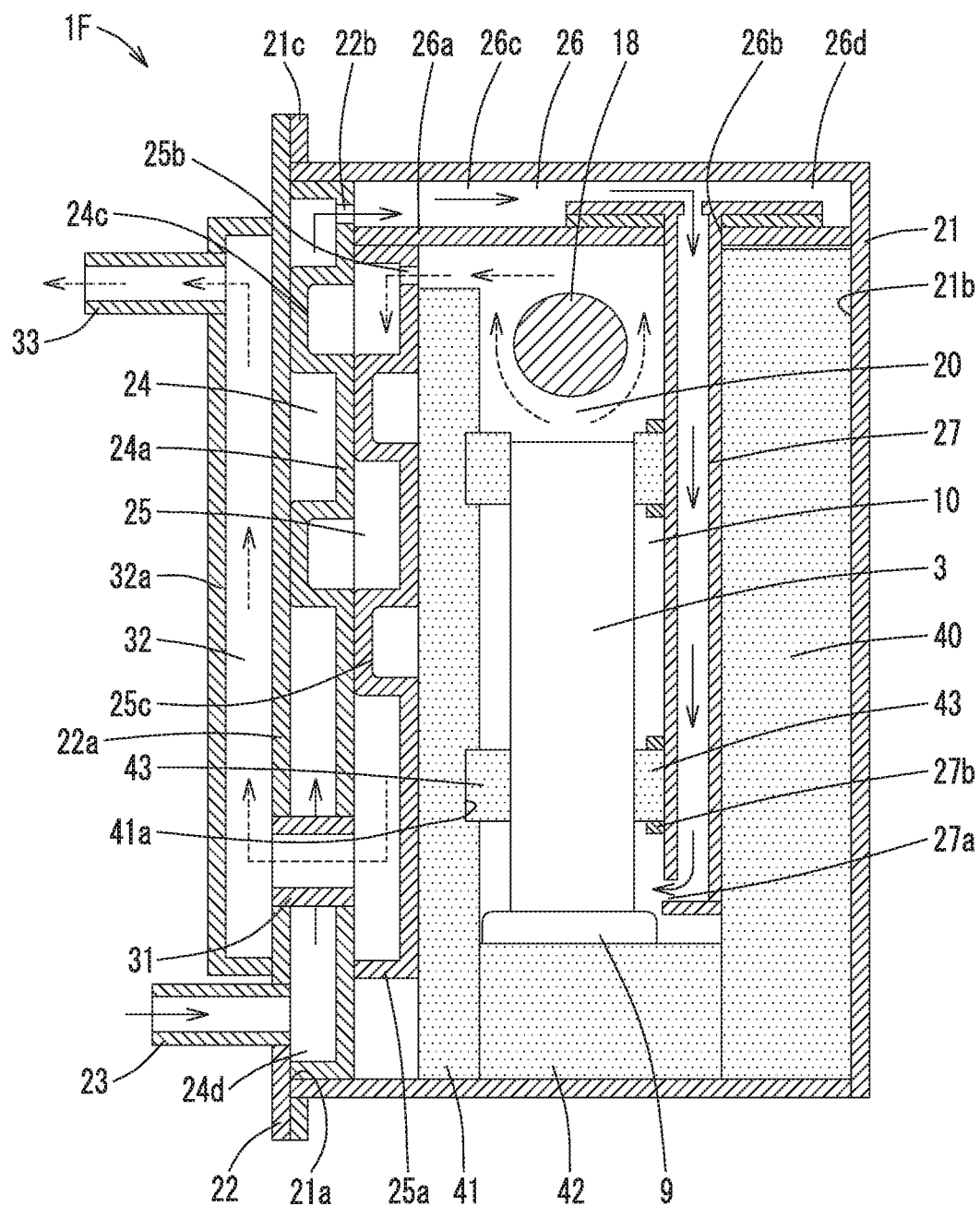
FIG. 8 is a cross-sectional view showing an example of a fuel cell module of still another non-limiting embodiment.

FIG. 8 is a cross-sectional view of a fuel cell module 1F of still another non-limiting embodiment. The present non-limiting embodiment is different from the above-described non-limiting embodiments in the shapes of the first flow channel member 24a and the second flow channel member 25a, and other portions are denoted by the same reference numerals as those of the above-described non-limiting embodiment and descriptions thereof are omitted.

As shown in FIG. 8, the first flow channel member 24a as the flow channel partitioning portion has a convex portion (first convex portion 24c) convex toward the inside of the first gas flow channel 24. With this structure, for example, as in the present non-limiting embodiment, the surface area of the flow channel partitioning portion which partitions the first gas flow channel 24 and the second gas flow channel 25 can be made large, so that heat exchange between the exhaust gas and the oxygen containing gas by heat conduction can be more efficiently performed. The flow channel partitioning portion may be convex toward the second flow channel member 25a.

Further, the first convex portion 24c may abut on the lid body 22a. With this structure, the heat exchange between the exhaust gas and the oxygen containing gas can be more efficiently performed by the lid body 22a and the first flow channel member 24a as the flow channel partitioning portion coming into contact with each other.

Moreover, in the present non-limiting embodiment, the second flow channel member 25a has a convex portion (second convex portion 25c) convex toward the inside of the second gas flow channel 25.

Further, as shown in FIG. 8, the first gas flow channel 24 and the second gas flow channel 25 may be meandering flow channels which meander in the right-left direction on a surface of the lid body 22a facing the box 21 along the concave portions (the first convex portion 24c, the second convex portion 25c). Specifically, in the first flow channel member 24a, the first convex portion 24c is formed so that the first gas flow channel 24 is a meandering flow channel.

In the second flow channel member 25a, the meandering second convex portion 25c is formed so that the second gas flow channel 25 is a meandering flow channel. The first convex portion 24c is convex toward the lid body 22a toward the inside of the first gas flow channel 24, and the second convex portion 25c is convex toward the first flow channel member 24a toward the inside of the second gas flow channel 25. Moreover, the first convex portion 24c and the second convex portion 25c are not formed in the same position but formed in positions shifted from each other in the vertical direction. Specifically, the first convex portion 24c abuts on the lid body 22a, and the second convex portion 25c abuts on a flat part in which the first convex portion 24c of the first flow channel member 24a is not formed. In other words, flow channels of parts facing each other of the first gas flow channel 24 and the second gas flow channel 25 are shifted in the vertical direction.

The first gas flow channel 24 and the second gas flow channel 25 can each be divided into an upper side flow channel and a lower side flow channel. The following relationship is satisfied: Sd>Su, where Su denotes the flow channel cross-sectional area of the upper side flow channel and Sd denotes the flow channel cross-sectional area of the lower side flow channel. That is, the flow channel cross-sectional area Sd in the second gas flow channel 25 on the lowermost side of the flow channel 25 and the downstream side is larger than the flow channel cross-sectional area Su in the upper side flow channel 25. With this structure, since the flow channel cross-sectional area of the most downstream side of the second gas flow channel 25 through which the exhaust gas flows can be made large, the stagnation of the exhaust gas can be suppressed. Further, the flow channel cross-sectional area Sd in the flow channel 24 on the lowermost side of the first gas flow channel 24 and the upstream side is larger than the flow channel cross-sectional area Su in the upper side flow channel 24. With this structure, the oxygen containing gas readily stagnates inside the first gas flow channel 24, so that heat exchange can be efficiently performed between the exhaust gas and the oxygen containing gas.

Figure 9:
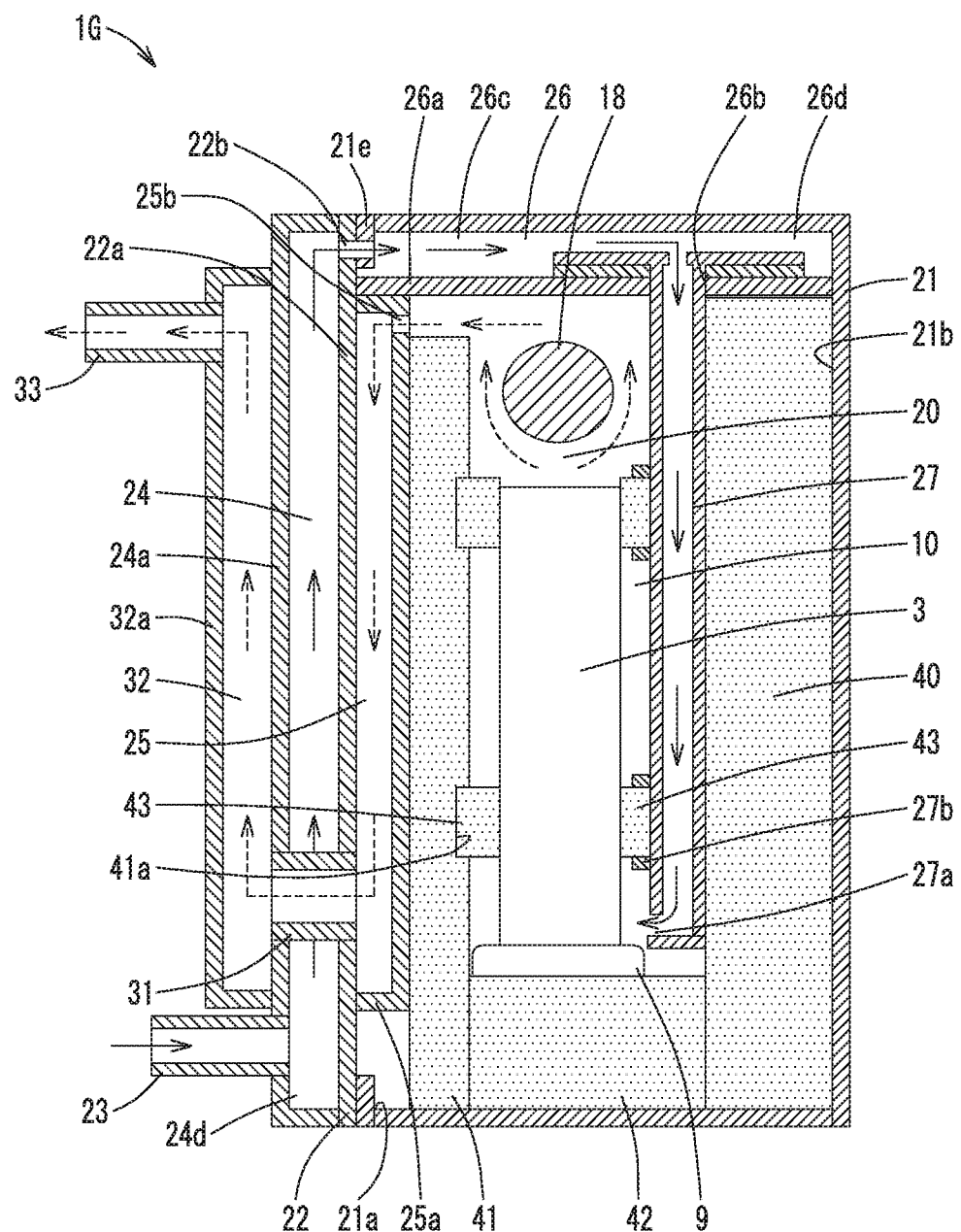
FIG. 9 is a cross-sectional view showing an example of a fuel cell module of still another non-limiting embodiment.

FIG. 9 is a cross-sectional view of a fuel cell module 1G of still another non-limiting embodiment. The present non-limiting embodiment is different from the above-described non-limiting embodiments in the shape of the flange portion of the box 21, and other portions are denoted by the same reference numerals as those of the above-described non-limiting embodiment and descriptions thereof are omitted. The box 21 has an inner flange portion 21e extending inward at the opening 21a, and the lid 22 is fixed to the inner flange portion 21e by a fixing member such as a screw, a bolt and nut, or a rivet. When the inner flange portion 21e has a size which closes the third gas flow channel 26, the inlet 22b is provided also at the inner flange portion 21e.

Since the outer flange portion 21c expands and contracts due to thermal expansion as described above, the box outer side insulating material 44 and the lid outer side insulating material 45 are disposed so as to sandwich the outer flange portion 21c from both sides thereof. In this case, it is difficult to effectively suppress heat dissipation from the outer flange portion 21c. By adopting the inner flange portion 21e as in the present non-limiting embodiment, the heat dissipation from the flange portion can be suppressed to thereby suppress the reduction in the temperature of the fuel cell module 1G.

As a modified example of the above-described non-limiting embodiments, a water storing portion 24d storing dew condensation water may be disposed on the upstream side of the first gas flow channel 24. By connecting the introducing portion 23 not to the upstream side end of the first gas flow channel 24 but to a slightly downstream side of the upstream side end, the dead end-like water storing portion 24d can be disposed at the upstream side end. At the time of stoppage such as shut-down of the fuel cell module, there is a possibility that the gas in the housing flows backward in the first gas flow channel 24. In this case, the gas in the housing contains moisture, so that there is a possibility that the temperature of this gas decreases to cause condensation while the gas in the housing is flowing backward in the first gas flow channel 24. If the dew condensation water further flows backward in the introducing portion 23, this becomes a cause of the breakdown of external apparatuses such as an air blower and sensors disposed on the upstream side thereof. The water storing portion 24d is located at the lower end in the vertical direction in the first gas flow channel 24 and the caused dew condensation water flows into the water storing portion 24d under its own weight and the dew condensation water never flow backward from the water storing portion 24d in the first gas flow channel 24 against gravity, so that the entry of the dew condensation water into external apparatuses can be suppressed.

Figure 10:
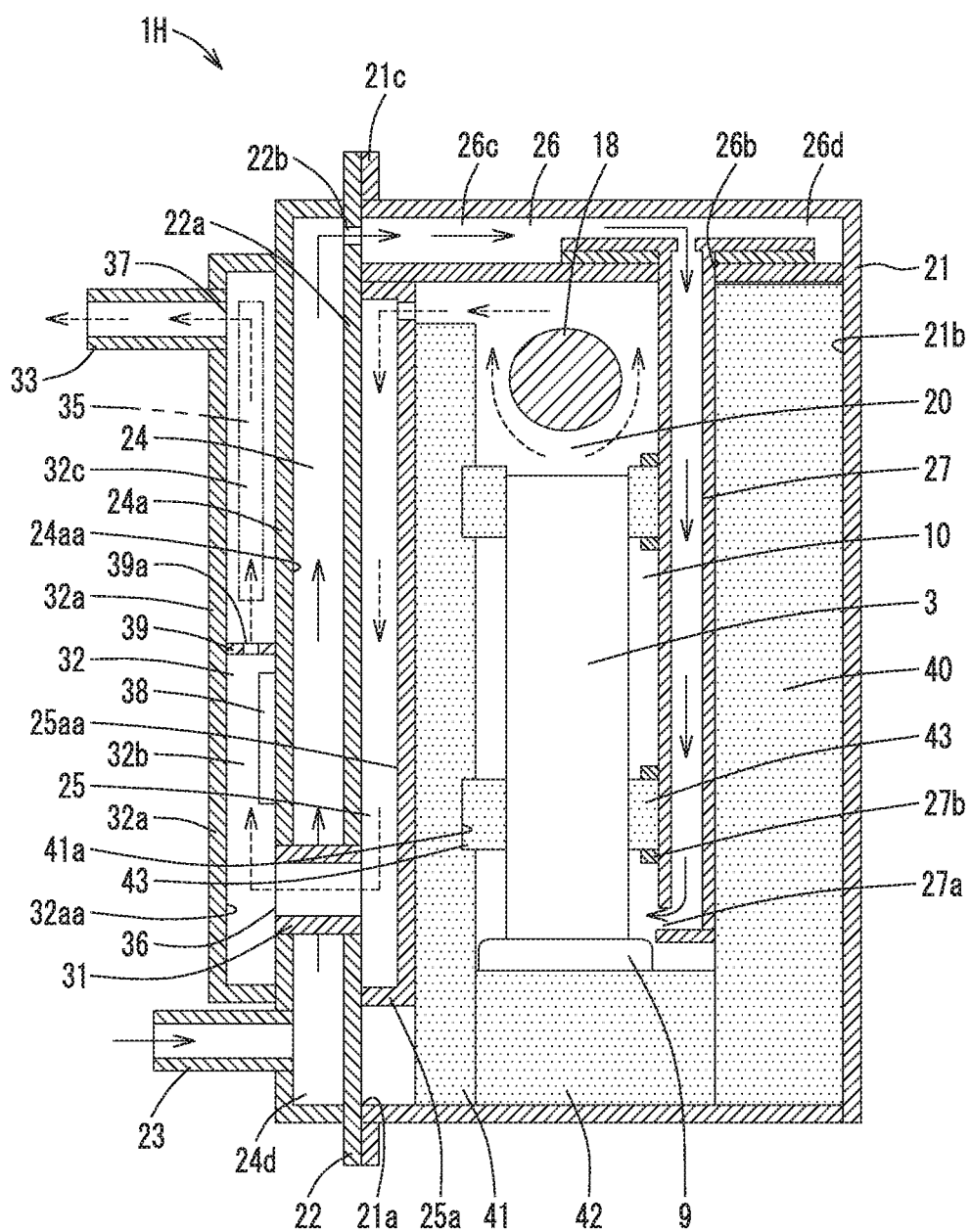
FIG. 10 is a cross-sectional view showing an example of a fuel cell module of still another non-limiting embodiment.
Figure 11:
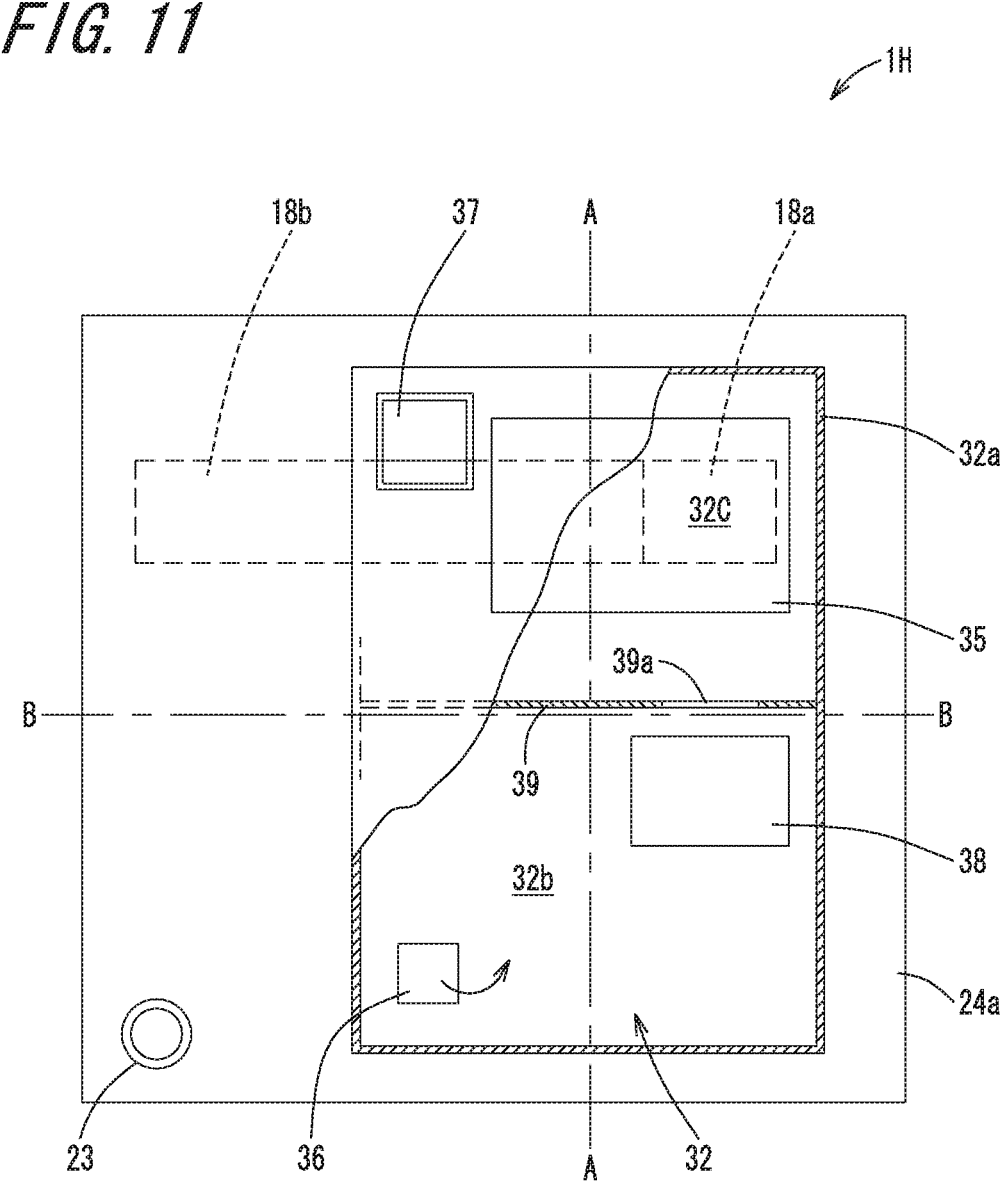
FIG. 11 is a side view showing an example in which part of a fuel cell module of still another non-limiting embodiment is excerpted.

FIG. 10 is a cross-sectional view of a fuel cell module 1H of still another non-limiting embodiment. FIG. 11 is a side view showing part of the fuel cell module 1H of still another non-limiting embodiment so as to be excerpted. The present non-limiting embodiment is different from the above-described non-limiting embodiments in that the fourth gas flow channel 32 is an exhaust gas processing chamber inside which a combustion catalyst 35 for combusting uncombusted components in the exhausted gas is disposed. In the following, the fourth gas flow channel 32 will be described, and descriptions of other portions are omitted.

In the present non-limiting embodiment, the fourth gas flow channel 32 is provided on the outer surface facing the outer side of the first flow channel member 24a, and the fourth flow channel member 32a defines the fourth gas flow channel 32. The fourth flow channel member 32a is a substantially rectangular member, and at the four sides, a part erected by the amount of the flow channel width of the fourth gas flow channel 32 is disposed on the first surface (one principal surface) 32aa side. The fourth flow channel member 32a joins the erected four side part to the outer surface facing the outer side of the first flow channel member 24a. The fourth flow channel member 32a covers the opening on the outer side of the fuel cell module 1H. Thereby, the gap between the first flow channel member 24a and the fourth flow channel member 32a becomes the fourth gas flow channel 32. That is, since the first gas flow channel 24 through which the oxygen containing gas flows is provided between the fourth gas flow channel 32 and the second gas flow channel 25 through which comparatively high temperature exhaust gas flows, heat exchange can be efficiently performed between the oxygen containing gas and the exhaust gas. Moreover, the opening of the discharging portion 31 on the outer side of the fuel cell module 1H is an exhaust gas inlet 36 of the fourth gas flow channel 32 as the exhaust gas processing chamber.

Inside the fourth gas flow channel 32, a combustion catalyst for combusting uncombusted components in the exhaust gas is disposed. As the combustion catalyst 35, for example, a porous carrier such as γ-alumina, α-alumina or cordierite which porous carrier carries a catalyst of a precious metal such as platinum or palladium may be used. Uncombusted components in the exhaust gas having flowed into the fourth gas flow channel 32 are combusted by the combustion catalyst 35 to be purified. After combusted by the combustion catalyst 35, the exhaust gas is discharged to the outside of the fourth gas flow channel 32 through the connection tube 33 disposed at the downstream side end of the fourth gas flow channel 32. The opening of the connection tube 33 on the inner side of the fuel cell module 1H is an exhaust gas outlet 37 of the fourth gas flow channel 32 serving as the exhaust gas processing chamber.

In the fuel cell module 1H of the present non-limiting embodiment, the fourth gas flow channel 32 is provided with a heater 38 disposed on the upstream side in the exhaust gas flow direction in the fourth gas flow channel 32. The combustion catalyst 35 is disposed on the downstream side in the exhaust gas flow direction of the heater 38 in the fourth gas flow channel 32. With this structure, since the exhaust gas increased in temperature by the heater 38 passes through the combustion catalyst 35, the combustion catalyst 35 can be uniformly heated. Thereby, the activity of the combustion catalyst 35 can be enhanced. Consequently, the efficiency of heat exchange between the exhaust gas and the oxygen containing gas can be further improved. Moreover, since the heater 38 is not directly in contact with the combustion catalyst 35, overheating of the combustion catalyst is suppressed, so that deterioration and breakage of the combustion catalyst 35 can be suppressed. A structure devoid of the heater 38 may be adopted.

As shown in FIG. 10, in the fuel cell module 1H, a partitioning member 39 is disposed between the facing first surface 24aa of the first flow channel member 24a and first surface 32aa of the fourth flow channel member 32a. The partitioning member 39 divides the fourth gas flow channel 32 into a first flow channel portion 32b including the exhaust gas inlet 36 and a second flow channel portion 32c including the exhaust gas outlet 37. The partitioning member 39 is provided with an exhaust gas distributing portion 39a. The first flow channel portion 32b and the second flow channel portion 32c communicate with each other only through the exhaust gas distributing portion 39a.

As shown in FIG. 11, in the fourth gas flow channel 32, when viewed from a side, the exhaust gas inlet 36 and the exhaust gas outlet 37 are located on the same side with respect to a first center line (the A-A line in FIG. 11; hereinafter, abbreviated as A) of the fourth gas flow channel 32 extending in the height direction of the fuel cell module 1H, and the exhaust gas distributing portion 39a is located on the different side from the exhaust gas inlet 36 and the exhaust gas outlet 37 with respect to the first center line A. Thereby, the length of the exhaust gas flow can be increased by making meander the exhaust gas flow from the exhaust gas inlet 36 to the exhaust gas outlet 37 by way of the exhaust gas distributing portion 39a, so that it is possible to increase the area in which heat exchange between the exhaust gas flowing in the fourth gas flow channel 32 and the oxygen containing gas flowing in the first gas flow channel 24 can be performed.

Here, since the vaporization of water at the vaporization portion 18a of the reformer 18 is an endoergic reaction, there is a possibility that the temperature around the vaporization portion 18a, in particular, the temperature of the fuel cells 3 located below the vaporization portion 18a is decreased by vaporizing water at the vaporization portion 18a. Accordingly, the temperature distribution of the cell stack 4 in the alignment direction of the fuel cells 3 becomes nonuniform, so that there is a possibility of decrease in the amount of power generation by the cell stack 4 or breakage of the cell stack 4.

In the fuel cell module 1H of the present non-limiting embodiment, as shown in FIG. 11, the exhaust gas distributing portion 39a and the heater 38 are disposed in positions closer to the vaporization portion 18a of the reformer 18 than the exhaust gas inlet 36 and the exhaust gas outlet 37 with respect to the first center line A. Here, the area of the second flow channel portion 32c located in the vicinity of the exhaust gas distributing portion 39a is high in temperature since the combustion of the exhaust gas by the combustion catalyst 35 actively progresses. Therefore, by disposing the exhaust gas distributing portion 39a in the vicinity of the vaporization portion 18a, the surroundings of the vaporization portion 18a can be warmed. Thereby, the temperature distribution of the cell stack 4 in the alignment direction of the fuel cells 3 can be made close to uniform. Further, since the surroundings of the vaporization portion 18a can be warmed by the heater 38 disposed in the vicinity of the vaporization portion 18a, the temperature distribution of the cell stack 4 in the alignment direction of the fuel cells 3 can be made close to uniform. It is desirable that the combustion catalyst 35 be disposed so that all the exhaust gas which has passed through the exhaust gas distributing portion 39a flow through the combustion catalyst 35.

The structure of the partitioning member 39 is not limited to the structure erected vertically to the outer surface facing the outer side of the first flow channel member 24a and the inner surface of the fourth flow channel member 32a facing the first flow channel member 24a shown in FIGS. 10 and 11. The partitioning member 39 may have a structure inclined to at least one of the outer surface facing the outer side of the first flow channel member 24a and the inner surface facing the inner side of the fourth flow channel member 32a.

While in the fourth gas flow channel 32 shown in FIG. 11, the heater 38 is disposed on the fourth flow channel member 32a, the heater 38 may be disposed on the upstream side of the combustion catalyst 35 in the exhaust gas flow direction in the fourth gas flow channel 32 and disposed so as to be closer to the vaporization portion 18a than the exhaust gas inlet 36 and the exhaust gas outlet 37 with respect to the first center line A. The heater 38 may be disposed, for example, in the second flow channel portion 32c or disposed over the first flow channel portion 32b and the second flow channel portion 32c.

Moreover, in the fuel cell module 1H, as shown in FIG. 11, the opening area of the exhaust gas outlet 37 is larger than the opening area of the exhaust gas inlet 36. Thereby, the pressure loss in the fourth gas flow channel 32 can be reduced to increase the exhaust gas flow amount in the fourth gas flow channel 32. Consequently, the efficiency of heat exchange between the exhaust gas flowing in the fourth gas flow channel 32 and the oxygen containing gas flowing in the first gas flow channel 24 can be improved. Regarding the exhaust gas inlet 36 and the exhaust gas outlet 37, the opening area of the exhaust gas outlet 37 may be larger than the opening area of the exhaust gas inlet 36, and the opening shape of the exhaust gas inlet 36 and the exhaust gas outlet 37 is not limited to the square shown in FIG. 11. The opening shape of the exhaust gas inlet 36 and the exhaust gas outlet 37 may be, for example, a circle, a rectangle or another shape. It is desirable that the opening area of the exhaust gas distributing portion 39a is at least larger than the opening area of the exhaust gas inlet 36.

Figure 12:
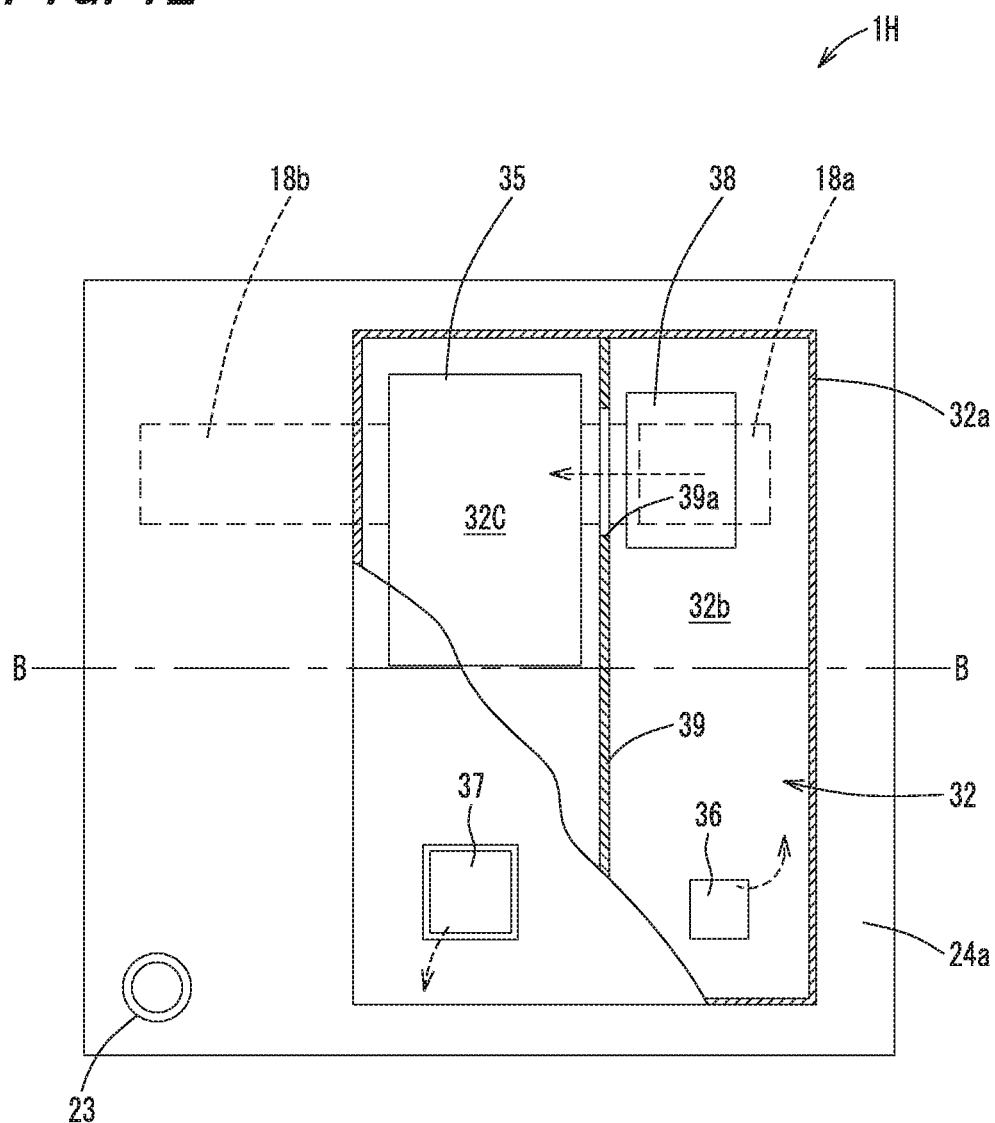
FIG. 12 is a side view showing another example in which part of a fuel cell module of still another non-limiting embodiment is excerpted.

FIG. 12 is a side view showing part of a modified example of the present non-limiting embodiment so as to be excerpted. The fuel cell module 1H may have a structure in which, as shown in FIG. 12, the exhaust gas inlet 36 and the exhaust gas outlet 37 are located on the same side with respect to a second center line (the B-B line in FIG. 12; hereinafter, abbreviated as B) of the fourth gas flow channel 32 orthogonal to the first center line A and extending in the alignment direction of the fuel cells 3, and the exhaust gas distributing portion 39a is located on the side different from the exhaust gas inlet 36 and the exhaust gas outlet 37 with respect to the second center line B. Even with this structure, since the length of the exhaust gas flow can be increased by making meander the exhaust gas flow from the exhaust gas inlet 36 to the exhaust gas outlet 37 by way of the exhaust gas distributing portion 39a, it is possible to increase the area in which heat exchange between the exhaust gas flowing in the fourth gas flow channel 32 and the oxygen containing gas flowing in the first gas flow channel 24 can be performed. Moreover, since the surroundings of the vaporization portion 18a can be warmed by the heater 38 disposed in the vicinity of the vaporization portion 18a, the temperature distribution of the cell stack 4 in the alignment direction of the fuel cells 3 can be made close to uniform. The connection tube 33 connected to the exhaust gas outlet 37 in the present non-limiting embodiment may extend to the side different from the exhaust gas inlet 36 and the exhaust gas outlet 37 with respect to the second center line B to be connected to the heat exchanger.

Figure 13A:
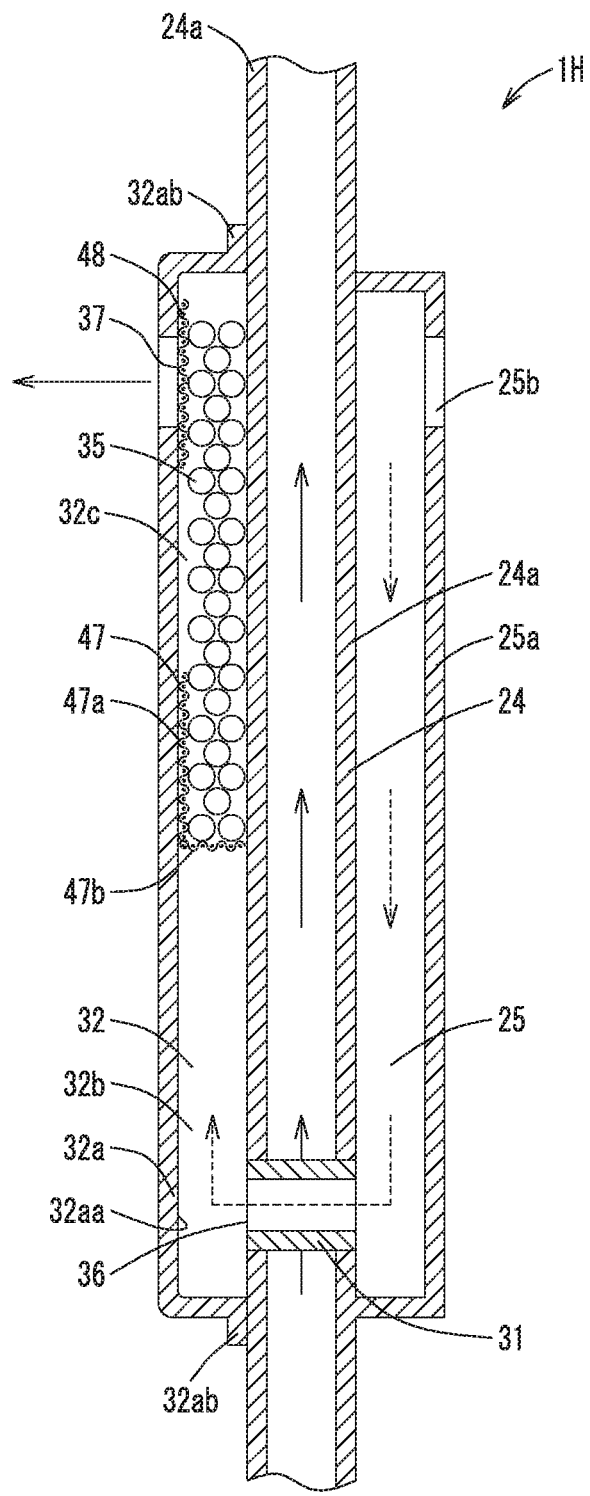
FIG. 13A is a cross-sectional view showing still another example in which part of a fuel cell module of still another non-limiting embodiment is excerpted.
Figure 13B:
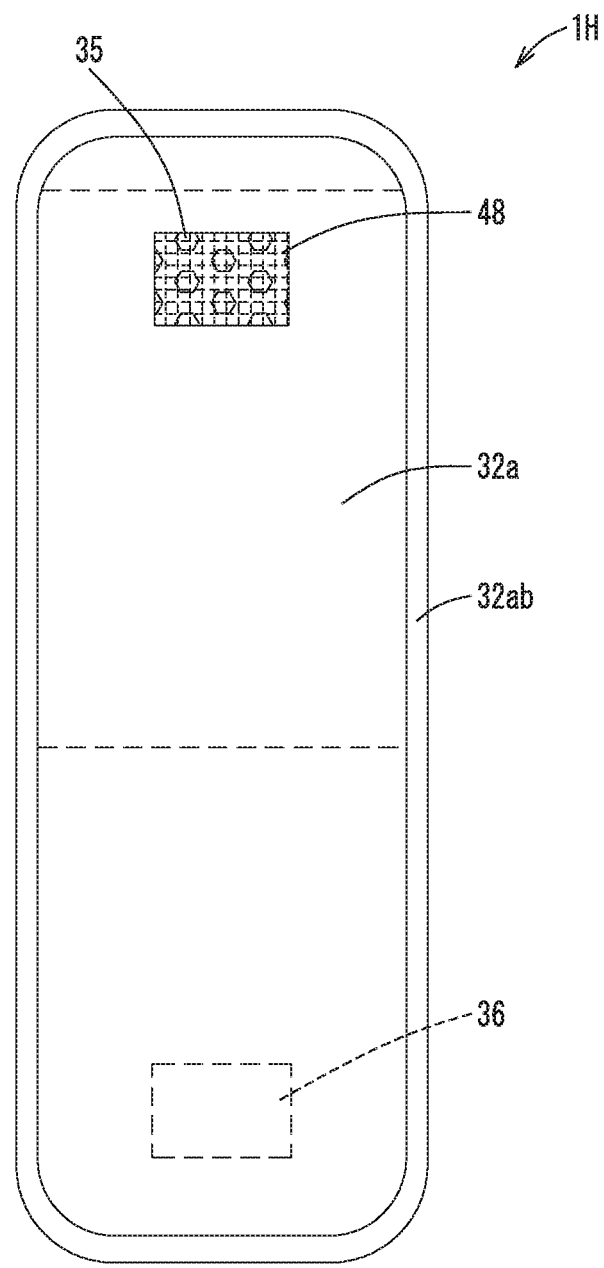
FIG. 13B is a side view showing still another example in which part of a fuel cell module of still another non-limiting embodiment is excerpted.
Figure 13C:
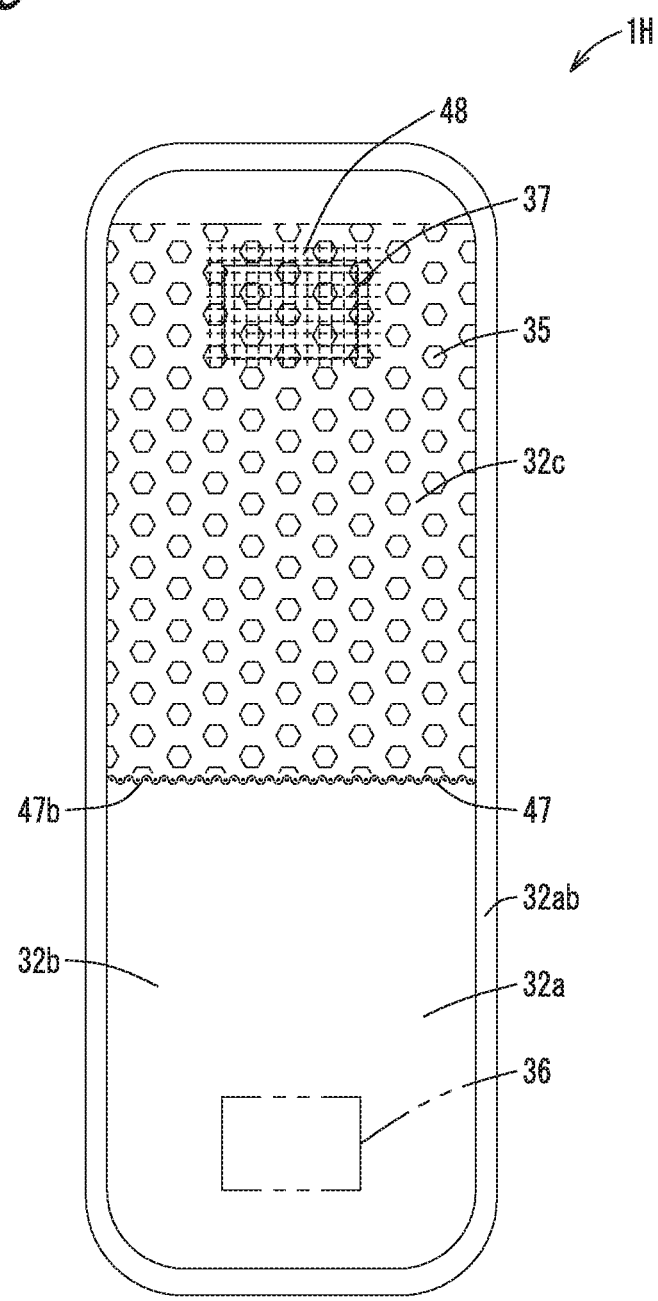
FIG. 13C is a side view, from a different viewpoint from FIG. 13B, showing still another example in which part of a fuel cell module of still another non-limiting embodiment is excerpted.

FIG. 13A is a cross-sectional view showing part of another modified example of the present non-limiting embodiment so as to be excerpted. FIG. 13B is a side view showing part of the another modified example of the present non-limiting embodiment so as to be excerpted. FIG. 13C is a side view, from a different viewpoint from FIG. 13B, showing part of the another modified example of the present non-limiting embodiment so as to be excerpted. In the fuel cell module 1H of the present modified example, as shown in FIG. 13A, a granular combustion catalyst 35, a first netlike member 47 and a second netlike member 48 are provided inside the fourth gas flow channel 32. FIG. 13B is a side view of part of the fuel cell module 1H viewed from the outer side. FIG. 13C is a side view of the fourth flow channel member 32a, the combustion catalyst 35, the first netlike member 47 and the second netlike member 48 viewed from the inner side of the fuel cell module 1H.

In the present modified example, the fourth flow channel member 32a is a vertically long substantially rectangular member, and at the four sides, a part erected by the amount of the flow channel width of the fourth gas flow channel 32 is disposed on the first surface 32aa side. At this erected part, an outer periphery flange portion 32ab extending outward is provided. By joining the outer periphery flange portion 32ab to the outer surface facing the outer side of the first flow channel member 24a, the gap between the first flow channel member 24a and the fourth flow channel member 32a becomes the fourth gas flow channel 32. The outer periphery flange portion 32ab and the first flow channel member 24a may be joined, for example, by welding.

Inside the fourth gas flow channel 32, the meshed first netlike member 47 may be disposed. The fourth gas flow channel 32 is divided by the first netlike member 47 into the first flow channel portion 32b including the exhaust gas inlet 36 and the second flow channel portion 32c including the exhaust gas outlet 37 and located above the first flow channel portion 32b.

As shown in FIG. 13A, the first netlike member 47 has a first portion 47a extending along the first surface 32aa of the fourth flow channel member 32a and a second portion 47b extending between the first flow channel member 24a and the fourth flow channel member 32a. The first portion 47a is joined to the first surface 32aa of the fourth flow channel member 32a, for example, by welding. The end on the first flow channel member 24a side of the second portion 47b abuts on the first flow channel member 24a.

In the second flow channel portion 32c, as shown in FIG. 13A, the granular combustion catalyst 35 may be filled to the height position above the upper end of the exhaust gas outlet 37. The meshes of the first netlike member 47 may have a diameter such that the granular combustion catalyst 35 filled in the second flow channel portion 32c does not pass through the first netlike member 47 to fall toward the first flow channel portion 32b. As the material forming the first netlike member 47, for example, a metal material such as stainless steel having heat resistance may be used.

On the first surface 32aa of the fourth flow channel member 32a, the netlike second netlike member 48 is disposed so as to cover the exhaust gas outlet 37. Thereby, the granular combustion catalyst 35 can be inhibited from moving outward from the exhaust gas outlet 37. The second netlike member 48 may be welded to the inner surface of the fourth flow channel member 32a. Moreover, the meshes of the second netlike member 48 may have a diameter such that the granular combustion catalyst 35 filled in the second flow channel portion 32c does not pass through the second netlike member 48. As the material forming the second netlike member 48, for example, a metal material such as stainless steel having heat resistance may be used.

According to the present modified example, the exhaust gas flowing into the fourth gas flow channel 32 from the exhaust gas inlet 36 uniformly flows in the fourth gas flow channel 32 toward the exhaust gas outlet 37. Since the exhaust gas passes through the entire granular combustion catalyst 35 filled in the second flow channel portion 32c, the entire combustion catalyst 35 can be efficiently used. Moreover, since the combustion catalyst 35 is held by the first netlike member 47 and positioned, it is unnecessary to provide a catalyst case accommodating the combustion catalyst 35 in the fourth gas flow channel 32. Thereby, the structure of the fourth gas flow channel 32 is simplified, so that the assembly performance of the fuel cell module 1H is improved.

Figure 14:
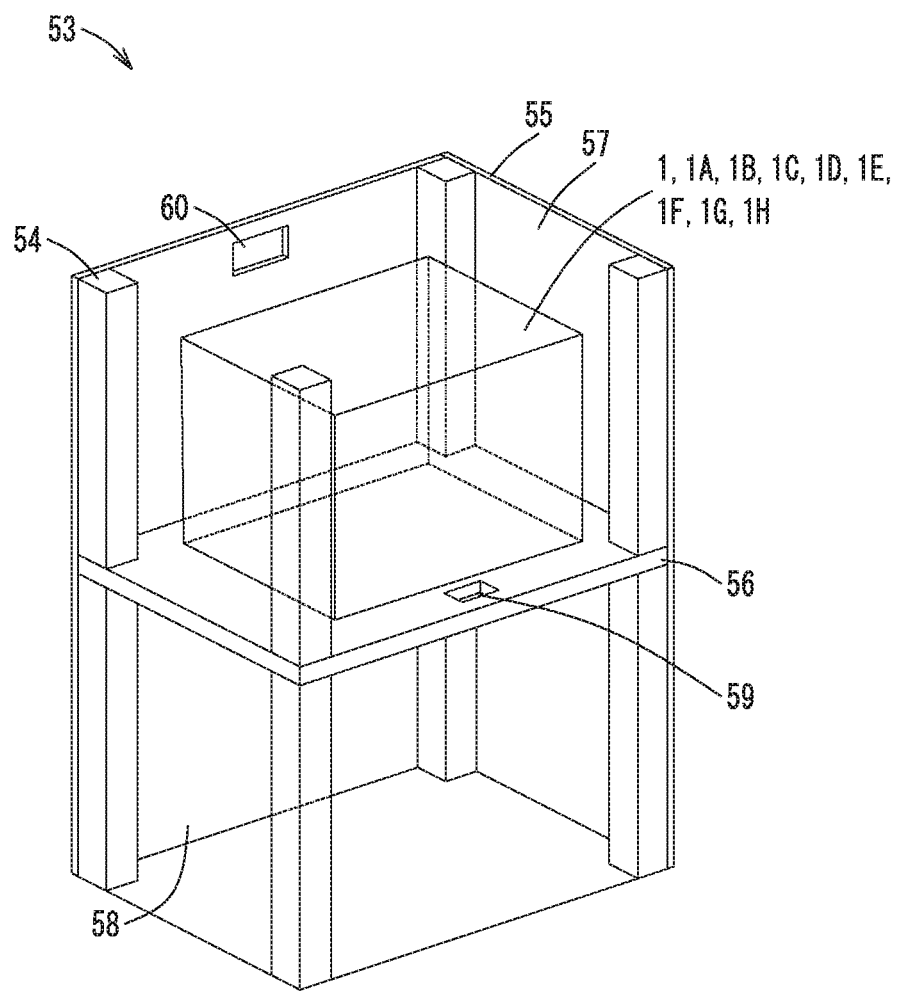
FIG. 14 is a transparent perspective view showing an example of a fuel cell apparatus of the present non-limiting embodiment.

FIG. 14 is a transparent perspective view showing an example of a fuel cell apparatus of the present non-limiting embodiment in which a fuel cell module and an auxiliary machine which operates the fuel cell module are housed in an exterior case. In FIG. 14, part of the structure is omitted.

In a fuel cell apparatus 53, the inside of the exterior case formed of pillars 54 and exterior plates 55 is vertically partitioned by a partitioning plate 56, the upper side thereof is a module accommodating chamber 57 which houses the above-described fuel cell module 1, 1A, 1B, 1C, 1D, 1E, 1F, 1G or 1H and the lower side thereof is an auxiliary accommodating chamber 58 which houses the auxiliary machine which operates the fuel cell module 1, 1A, 1B, 1C, 1D, 1E, 1F, 1G or 1H. The auxiliary machine housed in the auxiliary accommodating chamber 58 is omitted in the figure.

Moreover, an air flow port 59 for causing air in the auxiliary accommodating chamber 58 to flow toward the module accommodating chamber 57 is provided on the partitioning plate 56, and an exhaust port 60 for discharging the air in the module accommodating chamber 57 is provided on part of the exterior plates 55 constituting the module accommodating chamber 57.

While the present disclosure has been described above in detail, the present disclosure is not limited to the above-described non-limiting embodiments and various modifications, improvements and the like are possible without departing from the gist of the present disclosure.

REFERENCE SIGNS LIST 1, 1A, 1B, 1C, 1D, 1E, 1F, 1G, 1H: Fuel cell module
2: Housing
3: Fuel cell
4: Cell stack
21: Box
22: Lid
22a: Lid body
24: First gas flow channel
25: Second gas flow channel
26: Third gas flow channel
32: Fourth gas flow channel
53: Fuel cell apparatus
54: Pillar
55: Exterior plate
56: Partitioning plate
57: Module accommodating chamber
58: Auxiliary accommodating chamber
59: Air flow port
60: Exhaust port

What is claimed is:

1. A fuel cell module, comprising:
a housing comprising a box, wherein one side of the box is open, and a lid for closing the one side of the box; and
a cell stack, which is housed in an accommodation chamber disposed inside the housing, and in which a plurality of fuel cells, configured to generate power by use of fuel gas and oxygen containing gas, are disposed and electrically connected together;
wherein
the lid comprises a first gas flow channel through which is configured to flow either one of the oxygen containing gas and exhaust gas which is discharged from the accommodation chamber;
the lid further comprises a second gas flow channel disposed adjacent to the first gas flow channel and through which is configured to flow the other of the oxygen containing gas and the exhaust gas; and
the second gas flow channel is located closer to the cell stack than the first gas flow channel, the oxygen containing gas is configured to flow in the first gas flow channel, and the exhaust gas is configured to flow in the second gas flow channel.

2. The fuel cell module according to claim 1, wherein the first gas flow channel and the second gas flow channel are located on a box side of the lid.

3. The fuel cell module according to claim 2, wherein the lid further comprises an introducing portion which is configured to introduce the oxygen containing gas from outside and connects with the first gas flow channel.

4. The fuel cell module according to claim 1, wherein the lid further comprises a flow channel partitioning portion which partitions the first gas flow channel and the second gas flow channel, and
the flow channel partitioning portion has a convex portion convex toward an inside of the first gas flow channel or an inside of the second gas flow channel.

5. The fuel cell module according to claim 1, wherein each of the first gas flow channel and the second gas flow channel is a meandering flow channel which meanders in a right-left direction on a surface facing the box side of the lid, and
the first gas flow channel and the second gas flow channel are configured such that a flow channel cross-sectional area on a lower side of the meandering flow channel is larger than a flow channel cross-sectional area on an upper side of the meandering flow channel.

6. The fuel cell module according to claim 1, further comprising:
an oxygen containing gas introducing plate, which is located closer to a bottom surface of the box than the cell stack, wherein the oxygen containing gas introducing plate is configured to pass the oxygen containing gas along the bottom surface of the box and supply the oxygen containing gas to the cell stack through an oxygen containing gas introducing port.

7. A fuel cell module, comprising:
a housing comprising a box, wherein one side of the box is open, and a lid for closing the one side of the box;
a cell stack, which is housed in an accommodation chamber disposed inside the housing, and in which a plurality of fuel cells, configured to generate power by use of fuel gas and oxygen containing gas, are disposed and electrically connected together; and
an oxygen containing gas introducing plate, which is located closer to a bottom surface of the box than the cell stack;
wherein
the lid comprises a first gas flow channel through which is configured to flow either one of the oxygen containing gas and exhaust gas which is discharged from the accommodation chamber;
the lid further comprises a second gas flow channel disposed adjacent to the first gas flow channel and through which is configured to flow the other of the oxygen containing gas and the exhaust gas;
the oxygen containing gas introducing plate is configured to pass the oxygen containing gas along the bottom surface of the box and supply the oxygen containing gas to the cell stack through an oxygen containing gas introducing port; and
a third gas flow channel, which connects the first gas flow channel and the oxygen gas containing gas introducing plate, wherein the third gas flow channel is configured so that the oxygen containing gas which has passed through the first gas flow channel passes through the third gas flow channel to flow into the oxygen containing gas introducing plate.

8. The fuel cell module according to claim 7, wherein the third gas flow channel is provided on one end side in a length direction of the fuel cell, the third gas flow channel connects one end on a downstream side of the first gas flow channel and one end on an upstream side of the oxygen containing gas introducing plate so as to communicate with each other, and the introducing portion and the oxygen containing gas introducing port are provided on the other end side in the length direction of the fuel cell.

9. The fuel cell module according to claim 7, wherein the first gas flow channel and the third gas flow channel are connected with each other through a plurality of inlets disposed in parallel, and
the third gas flow channel is configured such that a flow channel cross-sectional area on an upstream side thereof connected to the first gas flow channel is larger than a flow channel cross-sectional area on a downstream side thereof.

10. The fuel cell module according to claim 7, wherein
the third gas flow channel is defined by a plurality of third gas flow channel walls opposed to each other, and
the third flow channel walls comprise abutment portions which are convex toward an inside of the third gas flow channel to abut on each other.

11. The fuel cell module according to claim 7, wherein
the third gas flow channel comprises a main flow channel portion which provides connection from the first gas flow channel to the oxygen containing gas introducing plate; and an extended portion extending toward the bottom surface of the box beyond a position where the oxygen containing gas introducing plate and the main flow channel portion are connected.

12. The fuel cell module according to claim 6, wherein
the first gas flow channel comprises a diverting portion configured for diverting the oxygen containing gas to the cell stack from the oxygen containing gas introducing plate.

13. The fuel cell module according to claim 1, wherein
the box comprises an outer flange portion extending outward at the opening, and
the fuel cell module further comprises an outer side insulating material which covers an outer surface of the box along the outer flange portion.

14. The fuel cell module according claim 1, further comprising
a storing portion configured to store condensation water, disposed on an upstream side of the first gas flow channel.

15. The fuel cell module according to claim 1, wherein
the lid further comprises a fourth gas flow channel disposed adjacent to the first gas flow channel and provided on an outer side of the first gas flow channel, and
the fourth gas flow channel connects with the second gas flow channel and is configured so that the exhaust gas which has passed through the second gas flow channel flows in the fourth gas flow channel.

16. The fuel cell module according to claim 15, wherein
a combustion catalyst for processing the exhaust gas is disposed inside the fourth gas flow channel.

17. The fuel cell module according to claim 16, wherein
the combustion catalyst is disposed on a downstream side in a flow direction of the exhaust gas in the fourth gas flow channel.

18. A fuel cell apparatus, comprising:
the fuel cell module according to claim 1;
an auxiliary machine which is configured to operate the fuel cell module; and
an external case which houses the fuel cell module and the auxiliary machine.

19. The fuel cell module according to claim 7, wherein
the box comprises an outer flange portion extending outward at the opening, and
the fuel cell module further comprises an outer side insulating material which covers an outer surface of the box along the outer flange portion.

* * * * *